(12) United States Patent
Kojima et al.

(10) Patent No.: US 7,351,460 B2
(45) Date of Patent: Apr. 1, 2008

(54) INFORMATION RECORDING MEDIUM, INFORMATION RECORDING DEVICE, AND INFORMATION RECORDING METHOD

(75) Inventors: Kyoko Kojima, Tokyo (JP); Motoyasu Terao, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 645 days.

(21) Appl. No.: 10/928,284

(22) Filed: Aug. 30, 2004

(65) Prior Publication Data

US 2006/0018231 A1   Jan. 26, 2006

(30) Foreign Application Priority Data

Jul. 21, 2004   (JP) .............................. 2004-212461

(51) Int. Cl.
*B32B 3/02* (2006.01)

(52) U.S. Cl. .................. 428/64.4; 428/64.2; 428/913; 430/270.14; 430/270.15; 430/270.16

(58) Field of Classification Search ............ 369/13.01, 369/94, 108, 272.1, 284; 428/64.1, 64.4, 428/64.8, 913, 64.2; 430/270.1, 270.11, 430/495.1, 945, 270.14, 270.15, 270.16, 430/270.17

See application file for complete search history.

(56) References Cited

U.S. PATENT DOCUMENTS

| | | | | |
|---|---|---|---|---|
| 4,735,879 | A * | 4/1988 | Hotta et al. .................... 430/19 |
| 4,773,060 | A * | 9/1988 | Shimada et al. ............. 369/100 |
| 4,842,381 | A * | 6/1989 | Green ........................ 359/269 |
| 6,556,470 | B1 * | 4/2003 | Vincent et al. ............. 365/151 |
| 6,606,184 | B2 * | 8/2003 | Guarr et al. ................. 359/265 |
| 6,710,823 | B2 * | 3/2004 | Faris et al. .................... 349/16 |
| 6,762,150 | B2 * | 7/2004 | Sawano ....................... 503/201 |
| 6,821,596 | B2 * | 11/2004 | Terao et al. ................ 428/64.1 |
| 6,977,883 | B2 * | 12/2005 | Terao et al. ................. 369/276 |
| 7,116,309 | B1 * | 10/2006 | Kimura et al. .............. 345/105 |
| 2003/0218941 | A1 | 11/2003 | Terao et al. |
| 2004/0001418 | A1 | 1/2004 | Shinotsuka et al. |
| 2005/0007936 | A1 * | 1/2005 | Terao et al. ................. 369/126 |
| 2005/0047309 | A1 * | 3/2005 | Terao et al. ................. 369/108 |
| 2005/0052983 | A1 * | 3/2005 | Vincent et al. ............. 369/126 |
| 2005/0088921 | A1 * | 4/2005 | Terao et al. ............. 369/13.01 |
| 2005/0276211 | A1 * | 12/2005 | Hirotsune et al. ........ 369/272.1 |

(Continued)

FOREIGN PATENT DOCUMENTS

JP            63-122032            5/1988

(Continued)

OTHER PUBLICATIONS

K. Kojima, et al., "Proposal of Multi-Information-Layer Electrically Selectable Optical Disk (ESD) Using the Same Optics as DVD", Proc. Of SPIE vol. 5069, pp. 300-305.

(Continued)

*Primary Examiner*—Gwenodolyn Blackwell
*Assistant Examiner*—Gerard T Higgins
(74) *Attorney, Agent, or Firm*—Antonelli, Terry, Stout & Kraus, LLP.

(57) ABSTRACT

An information recording medium includes an insulating member, first and second electrodes formed in one plane of the insulating member, and a conductive layer having an electrochromic material providing continuity with the first and second electrodes. A gap between the first and second electrodes is insulated.

17 Claims, 25 Drawing Sheets

U.S. PATENT DOCUMENTS

2006/0140100 A1* 6/2006 Wilderbeek et al. ........ 369/100
2006/0187808 A1* 8/2006 Kahlman et al. ........ 369/275.1
2007/0121428 A1* 5/2007 Fujita et al. ............. 369/13.01

FOREIGN PATENT DOCUMENTS

JP 11-185288 7/1999
JP 2002-82360 3/2002

OTHER PUBLICATIONS

J.C. Scott, et al., "Electronic-spin-resonance studies of pyrole polymers : Evidence for Bipolarons", Physical Review B, vol. 28, No. 4, Aug. 15, 2983, pp. 2140-2145.

* cited by examiner

INFORMATION RECORDING MEDIUM, INFORMATION RECORDING DEVICE, AND INFORMATION RECORDING METHOD

CLAIM OF PRIORITY

The present application claims priority from Japanese application JP 2004-212461 filed on Jul. 21, 2004, the content of which is hereby incorporated by reference into this application.

CO-PENDING APPLICATIONS

U.S. patent application Ser. Nos. 10/817,863 and 10/763,274 are co-pending applications of the present application. The disclosures of these co-pending applications are incorporated herein by cross-reference.

FIELD OF THE INVENTION

The present invention relates to an information recording medium, information recording device, and an information recording method in which information is recorded using light.

BACKGROUND OF THE INVENTION

In this specification, a medium to read/write information such as an optical disk is referred to as an information recording medium. Conventionally, optical disks exist in which a phase change film is used for the recording layer such as a DVD-RAM, and an organic material is used for the information layer such as a CD-R and DVD-R. An optical disk using an organic material as the information layer has an information layer including a pigment, which has absorption in the wavelength of the recording light source, and recording is performed by changing the characteristics of the substrate surface connected thereto using laser irradiation.

As described in, for instance, patent document 1 (JP-A No. 122032/1983), a field-effect optical disk is well known, in which information is recorded on a phase change recording film by irradiating a laser beam under the condition where an electric field is applied to the recording layer. It is used for an element structure sandwiching a phase change information layer such as GeSbTe system between the upper and lower electrodes. It aims to accelerate the phase change (crystallization) by applying an electric field to the recording film than by only irradiating a laser beam.

Making multi-layers is well known as a method to increase the storage capacity of an optical disk using a phase change film. Patent document 2 (JP-A No. 30878/2004: US2004/0001418A1) discloses a two-layer type optical recording medium in which two recording layers consisting of a phase change material are laminated.

The inventors proposed an optical recording medium in non-patent document 1 (Proceedings SPIE vol. 5069, p. 300), in which more recording layers can be laminated by reversibly coloring the laminated recording layer using the principle of electrochromism.

Moreover, patent document 3 (JP-A No. 82360/2002) discloses an invention of a display device in which the principle of electrochromism is used. Furthermore, patent document 4 (JP-A No. 185288/1999) discloses an invention of an optical device recording information by coloring the reflection layer using electrochromism. Patent document 5 (JP-A No. 346378/2003: US2003/218941A1) discloses an invention of an information recording medium, in which information recording is carried out by applying a voltage to the upper and lower sides of the recording layer colored by electrochromism.

[Patent document 1] JP-A No. 122032/1983
[Patent document 2] JP-A No. 30878/2004
[Patent document 3] JP-A No. 82360/2002
[Patent document 4] JP-A No. 185288/1999
[Patent document 5] JP-A No. 346378/2003
[Non-patent document 1] Proceedings SPIE vol. 5069, p 300
[Non-patent document 2] http://www.sanyovac.co.jp/Englishweb/products/EITOonglass.html
[Non-patent document 3] J. C. Street et. al. Physical Review B, Vol. 28, No. 4, p. 2140-2145

SUMMARY OF THE INVENTION

JP-A No. 30878/2004 uses a phase change film having photoabsorption regularly in the recording layer, and there was a problem that read/write became difficult in the case of increasing the recording layers to three or more because the recording laser beam did not reach the deeper recording layers.

The following are results of an investigation carried out to solve the above-mentioned problems.

(1) In the method described in non-patent document 1 (Proceedings SPIE vol. 5069, p. 300), if the number of layers is increased, the quantity of light reaching the deeper layers would be decreased because a transparent electrode, which is sandwiching an electrochromic recording layer and to which a voltage is applied to color the recording layer, exhibits some absorption. For the transparent electrode layer, light transmittance close to 100% is required for making the light efficiency as high as possible, and electrical resistivity not more than 50 $\Omega$/sq is required for coloring the recording layer quickly and uniformly. However, it is known that a transparent electrode actually has an absorption in the visible range and that high light transmittance and electric resistivity do not coexist. It will be explained as follows using the principal of the manifestation of electroconductivity in the transparent electrode material.

The conductivity of a compound such as ITO used for the transparent electrode is given by the defining equation for electrical conductivity (expression 1). Here, electron conduction is considered.

$$\sigma = ne\mu \qquad \text{(expression 1)}$$

$\sigma$ is the electrical conductivity, n is the carrier density, e is the electric charge of an electron, and $\mu$ is the mobility of the carrier.

Here, the carrier is a free electron because electron conduction is being considered. In this equation, the factor relating to the photoabsorption of the transparent electrode is the carrier density n. In order to decrease the electric resistivity of indium oxide ($In_2O_3$), tin oxide ($SnO_2$), etc., carrier densities are increased by adding tin (Sn) and aluminum (Al), etc. respectively as a dopant, resulting in defect formation in the crystal lattice of the oxide.

However, an increase of free electrons, which are carriers in the transparent electrode, absorbs light with a lower frequency than the plasma frequency, so there is obviously a trade-off relationship regarding the transparency of the electrode. The plasma frequency $\omega$ is given as following.

$$\omega = ne^2/\epsilon_0 \epsilon_\infty m_\infty \qquad \text{(expression 2)}$$

Here, n is the carrier density, $\epsilon_\infty$ is the optical dielectric constant, and $m_\infty$ is the optical effective mass. With increasing n, ω becomes greater and light from near infrared to the visible region becomes absorbed.

In addition to there being essentially a trade-off relationship between the electrical conductivity and transparency, there is a limit to the increase in carrier density. For instance, in order to decrease the electrical resistivity of the transparent electrode to a sheet resistance not more than 30 Ω/sq, it is necessary to increase the thickness of the electrode layer, and the problem arises that the transparency has to be sacrificed even more. Non-patent document 2 (http://www.sanyovac.co.jp/Englishweb/products/EITOonglass.html) discloses the relationship between the sheet resistance, the transmittance, and film thickness of an ITO film. For instance, it is reported that an ITO film with a sheet resistance of 150 Ω/sq had a light transmittance of 88% for a wavelength of 550 nm when the film thickness was 20-30 nm, on the other hand, an ITO film with 2.5 Ω/sq had a light transmittance of 75% for a wavelength of 550 nm when the film thickness was 580-620 nm.

In contrast to this, a basic unit of the information recording medium of the present invention is an electrochromic element as shown in the cross-sectional structure of FIG. 1. The basic unit consists of the conductive layer 7 including electrochromic materials formed connecting to both the first electrode 2 and the second electrode 3 formed on the insulating substrate 1. That is, the information recording medium of the present invention is characterized by consisting of the insulating member, the first and second electrodes formed in one plane of the aforementioned insulating member, and the conductive layer including electrochromic materials providing continuity with the aforementioned first and second electrodes, in which the gap between the aforementioned first and second electrodes is insulated. As a result, in the electrochromic element constituting the information recording medium of the present invention, there is one transparent electrode layer fewer compared with a conventional electrochromic element which has a structure sandwiching an electrochromic layer and electrolyte layer with transparent electrodes. Therefore, according to the present invention, there is an advantage that the light efficiency utilization is high in the case when many layers of electrochromic elements are laminated.

(2) Moreover, in the investigation of the electrochromic element lamination process tested by the inventors, it was discovered that an increase in driving voltage of the electrochromic element and worsening of the coloring cycle characteristics happened because of the degradation introduced to the electrolyte layer and electrochromic layer caused by the damage when the transparent electrode layer such as ITO was directly formed by the RF magnetron sputtering technique on an electrolyte layer consisting of a solid polymer electrolyte and an electrochromic layer including a conductive polymer electrochromic material.

On the other hand, according to the lamination method of the present invention, degradation introduced in the elements caused by damage while sputtering can be avoided because it is not necessary to form ITO electrodes directly on the electrochromic layer and the electrolyte layer. It will be described concretely as follows.

As shown in FIG. 11, in the case when the electrochromic layers are multi-layer laminated, it is preferable to fabricate them using a method in which a transparent electrode, electrochromic layer, and electrolyte layer are laminated in order. For instance, ITO electrode 312 and ITO electrode 313 are formed electrically separated from each other on the insulating polycarbonate substrate 311. The electrochromic layer 314 is formed by a coating process so that it is connected to the polycarbonate substrate 311, ITO electrode 312, and ITO electrode 313. The electrolyte layer 315 is formed by coating on the electrochromic layer. One unit of an electrochromic element is fabricated here. In the multi-layer lamination of the electrochromic element, the insulating layer 316 is placed on top of the electrolyte layer 315. Here, polyimide, polyvinyl alcohol, polycarbonate, polyethylene, and $SiO_2$, etc. are used as the material for the insulating layer. Similarly forming the electrochromic layer 319 and electrolyte layer 320, in order, on the insulating layer 316, results in formation of the second unit of the electrochromic element. Thereafter, one should stack the insulating layer, ITO electrode, electrochromic layer, and electrolyte layer on the electrolyte layer 320 to increase the number of electrochromic element layers. Moreover, it would be an operative element even if the order of laminating the electrochromic layer and electrolyte layer were reversed; therefore, the laminating order can be arbitrarily selected.

According to this lamination method, degradation of the element caused by damage while sputtering can be avoided because it is not necessary to form the ITO electrode directly on the electrochromic layer and the electrolyte layer.

A concrete configuration of the present invention will be described as follows. As described above, the information recording medium of the present invention has a basic unit of an electrochromic element illustrated in the cross-sectional structure in FIG. 1, in which the basic unit consists of the conductive layer 7 including an electrochromic material formed connecting to both the first electrode 2 and the second electrode 3 deposited on the insulating substrate 1. That is, the information recording medium of the present invention consists of the insulating member, the first and second electrodes formed on one plane of the aforementioned insulating member, and the conductive layer including an electrochromic material providing continuity with aforementioned first and second electrodes, wherein the aforementioned gap between the first and second electrodes is insulated. Moreover, the conductive layer 7 consists of two layers, the electrochromic layer and the electrolyte layer, along the direction of the layer parallel to the arrangement of the first electrode 2 and the second electrode 3. Two different types of structure are possible for the two-layer configuration. Concretely, the electrochromic layer 14 is formed so as to connect with both the first electrode 12 and the second electrode 13 in the first structure as shown in the cross-sectional structure of FIG. 2.

Moreover, the electrolyte layer 104 is formed on the electrochromic layer 14 so as not to connect with the insulating substrate 11, the first electrode 12, and the second electrode 13. Wiring between the first electrode 12 and the second electrode 13 is from the power supply 15, thus a voltage can be supplied. The structure illustrated in FIG. 3 is also possible in which the two-layer structure of the conductive layer 57 is laminated in the opposite order. Here, the structures illustrated in FIGS. 2 and 3 are called the first structure and the second structure, respectively. In the element having the second structure shown in FIG. 3, the electrolyte layer 104 is formed so as to connect with both the first electrode 12 and the second electrode 13 deposited on the insulating substrate 11. Moreover, the electrochromic layer 14 is formed on the electrolyte layer 104 so as not to connect with the first electrode 12 and the second electrode 13. Wiring between the first electrode 12 and the second electrode 13 is from the power supply 15, thus a voltage can be supplied.

FIG. 4 illustrates a structure viewing the element shown in the cross-sectional structure FIG. 2 from above the electrolyte layer 104. The first electrode 12 and the second electrode 13 are formed on the insulating substrate 11, and the electrochromic layer and the electrolyte layer 107 are laminated on top of them. Here, the electrochromic layer exists under the electrolyte layer 104. The gap between the first electrode 12 and the second electrode 13 is wired from the power supply 15. Here, except for polycarbonate which is generally used for optical disks, a polymeric material such as polyolefin, polyethylene, polypropylene, polyethylene terephthalate (PET) and acrylate resin or inorganic materials such as glass, quartz, and sapphire is used for the insulating substrate.

A metallic oxide such as ITO (indium tin oxide), indium oxide ($In_2O_3$), fluorine-doped indium oxide (FTO), tin oxide ($SnO_2$), and IZO (indium zinc oxide) or a metal such as aluminum, gold, silver, palladium, copper, chromium, platinum, and rhodium is used for the first electrode and the second electrode. Since metal oxide compounds such as ITO have high light transmittance, transparency is given to the whole element if a transparent insulating substrate is used. Moreover, metal such as aluminum, gold, and chromium has a high visible reflection coefficient, so that they become possible to fabricate a reflecting electrochromic element. The first electrode and the second electrode are electrically separated from each other at a distance from 1 μm to 1 cm. At least one material selected from conductive polymeric electrochromic materials, transition metal oxide electrochromic materials, and organic low molecular weight electrochromic materials is used for the electrochromic layer. The electrochromic layer is used in the film thickness range from 10 nm to 10 μm.

Here, the conductive polymeric electrochromic material means a polymer having a semiconductive conductivity and the color (absorption spectrum) changes reversibly by applying voltage. Polyacetylene, polyaniline, polypyrrole, polythiophene, polyphenylenevinylene, and their derivatives are listed as the conductive polymer electrochromic material, which are conjugated polymers connected by conjugated double bonds or triple bonds. Electrochromism of these conductive polymeric electrochromic materials depends on the following principles. Here, a polythiophene will be described as an example. FIG. 5 is an illustration of the electronic resonance structure of a polythiophene in the ground state, and two structures are possible, an aromatic type structure 21 and a quinoid type structure 22. Comparing between the aromatic type structure 21 and quinoid type structure 22, the ground state of polythiophene does not degenerate because the aromatic type structure 21 has a lower energy and both structures are not energetically equivalent. Such a resonance of the π electron in polythiophene corresponds to the wavelength of visible light, therefore, structures which do not degenerate reciprocally are observed as a difference in color.

The above-described operation occurs except for polythiophene, polyaniline, polypyrrole, and polyphenylenevinylene, which are nondegenerate conductive polymers in which the ground state does not degenerate. Non-patent document 3 (J. C. Street et. al., Physical Review B, Vol. 28, No. 4, p. 2140-2145) described that the electrochromism of nondegenerate conductive polymers is explained by polarons and bipolarons as follows. FIG. 6 shows the change of the molecular structure of polythiophene by doping.

When an acceptor is doped in the neutral state 23 of polythiophene, 1 electron oxidation 24 first occurs, becoming 1 electron oxidation state 25. Here, halogens such as $Br_2$, $I_2$, and $Cl_2$, Lewis acids such as $BF_3$, $PF_5$, $AsF_5$, $SbF_5$, $SO_3$, $BF_4^-$, $PF_6^-$, $AsF_6^-$, $SbF_6$, proton acids such as $HNO_3$, HCl, $H_2SO_4$, $HClO_4$, HF, and $CF_3SO_3H$, transition metal halogenides such as $FeCl_3$, $MoCl_3$, and $WCl_5$, and organic materials such as tetracyanoethylene (TCNE), 7,7,8,8-tetracyanoquinodimethane (TCNQ) are listed as the acceptors used for doping. 1 electron oxidation state 25 becomes a positive charged polaron state 27 through the relaxation process 26. According to the fifth edition of the Physics and Chemistry Dictionary (1998, Iwanami Shoten Publishers), a polaron is a state in which conduction electrons in a crystal move accompanied by deformation of the surrounding crystal lattice.

Here, in the polaron state, "crystal" is replaced with "neutral state in a polythiophene molecule" and "deformation of crystal lattice" is thought to be "appearance of a partial quinoid structure of a polythiophene molecule due to 1 electron oxidation". If an acceptor is additionally doped to the polythiophene in the polaron state 12, oxidation proceeds further, resulting in a positive bipolaron state 28. On the other hand, a negatively charged polaron and bipolaron are generated by donor doping according to the reduction reaction 29. Here, alkaline metals such as Li, Na, K, and Cs, and quaternary ammonium ions such as tetraethylammonium and tetrabutylammonium are listed as donors used for doping. Because both polarons and bipolarons are transported on the polymer chains, they contribute to current. Polymer electrolytes, so called polymer dopants, can also be used in addition to the above-mentioned dopants. For instance, polystyrene sulfonate, polyvinyl sulfonate, and sulfonated polybutadiene are examples. When polyaniline, polythiophene, and polypyrrole are polymerized with the presence of these polymer electrolytes, the conductive polymers formed are obtained as ion complexes with the polymer electrolyte used. Using polymer dopants effective to improve the processability, for instance, insoluble conductive polymers can be made soluble.

The relationship between polaron, bipolaron, and electrochromism will be described in FIG. 7, in which the electron state of the nondegenerate conductive polymer is illustrated according to the band structures. Here, the change in electron state with acceptor doping is shown. In the non-doped neutral state band structure 32, the electron energy 36, the so-called forbidden band width 35, exists as the energy difference between the lowest energy of the conduction band 34 and the highest energy of the valence band 33, and light which has the energy corresponding to the forbidden band width 35 is absorbed as the allowed transition 37. If the wavelength of the absorbed light is in the wavelength region of visible light, it looks colored. Here the forbidden band width 35 of the nondegenerate conductive polymers is generally from 0.1 eV to 3 eV which is the same as an inorganic semiconductor. The two polaron levels, bipolaron level $p^+39$ and bipolaron level $p^-40$, are created between the valence band 33 and the conduction band 34 in the band structure 38 in the positive polaron state formed as a result of acceptor doping. Because the allowed transition 41 in the polaron state is different from the allowed transition 37 in the neutral state, the absorption characteristics of light are changed, and the change in the visible light region is observed as a change in color. Moreover, in the band structure 42 in the bipolaron state where doping is taking place, two new bipolaron levels, bipolaron level $BP^+43$ and bipolaron level $BP^-44$, are formed, and the light absorption characteristics are changed even more because the allowed transition 45 in the bipolaron state is changed. In the case of donor doping in a nondegenerate conductive polymer, the change of allowed transition behavior caused by the change of the band structure with the formation of polaron levels and bipolaron levels is similarly observed as electrochromism.

Because the electrochromic characteristics accompanying doping in nondegenerate conductive polymers are used for the electrochromic element, especially here, the nondegenerate conductive polymer is called a "conductive polymer electrochromic material". Compounds selected from tungsten oxide, iridium oxide, nickel oxide, titanium oxide, and vanadium pentoxide, etc. are used for the transition metal oxide electrochromic material. The electrochromism of tungsten oxide will be explained as an example. Tungsten oxide itself is colorless or buff yellow, but it changes reversibly into deep blue by reducing a part. The electrochromism of tungsten oxide is described in (expression 3).

(expression 3)

Here, x is an arbitrary number from 0 to 1, $M^+$ is a proton or a cation such as a lithium ion, and $e^-$ is an electron, respectively. The reduction reaction shown in (expression 3) takes place electrochemicaly. The right side of (expression 3) means the state in which tungsten oxide is partially reduced, and pentavalent and hexavalent tungsten atoms are coexisting "mixed valence state", thereby chromophores appear because of "intervalence transition adsorption" which is the transition between tungsten atoms with different valences. In general, the electrochromism of transition metal oxides is closely related to a phenomenon of the mixed valence.

The electrolyte layer contains cations, for instance, lithium ions which are necessary to reversibly color an electrochromic layer by applying a voltage, and has ionic conductivity. Liquid electrolytes, gel electrolytes, and solid electrolytes are known by their classification according to differences of phase state, and solid electrolytes are used for the information recording medium.

The electrolyte layer is used in a range of thickness from 50 nm to 5 mm. In the case of the information recording medium using light, the preferable thickness is from 50 nm to 200 nm. In the case of liquid electrolytes and gel electrolytes, a spacer or partition is necessary to be provided around the electrolyte layer of the element. The typical component of an electrolyte is lithium salt, which is the supply source of the lithium ion reversibly going in and out of the electrochromic layer, an organic solvent or polymeric material exhibiting ionic conductivity, which is the matrix dissolving the lithium salts.

Moreover, the ionic conductivity of the electrolyte is preferably $10^{-5}$ S/cm or more at around 25° C. The matrix material itself has preferably no photoabsorption. Polymethyl methacrylate (PMMA), polyvinyl butyral (PVP), polyethylene oxide (PEO), polypropylene oxide (PPO), polyacrylonitrile (PAN), polyvinylidene fluoride (PVDF), polyethylene carbonate (PEC), and polypropylene carbonate (PPC) are used as the polymer material for matrix. These polymers can be used either singly or in the form of plural combinations.

Lithium tetrafluoroborate ($LiBF_4$), lithium perchlorate ($LiClO_4$), lithium hexafluorophosphate ($LiPF_6$), lithium hexafluoroarsenate ($LiAsF_6$), lithium hexachloroantimonate ($LiSbF_6$), lithium trifluorate ($LiCF_3SO_3$), and N-lithium trifluoromethane sulfonic imide ($Li(CF_3SO_2)_2N$) can be used as the lithium salt. The lithium salt is added to the aforementioned polymer material in a range from 0.1% to 50% by weight.

Here, the principles of operation of the electrochromic element with the first structure constituting the information recording medium of the present invention will be described using FIG. 8. An element using an electrochromic compound which is colorless in the steady state and deeply colored by doping lithium ions is used in this description, such as poly (3,4-ethylene dioxythiophene)-polystyrene sulfonate complex and tungsten oxide. The power supply 56 is connected to the gap between the first electrode 52 and the second electrode 53 formed on the insulating substrate 51, and a voltage is applied. The applied voltage is controlled to be from 2 V to 20 V in this case. The electric field 208 generated between the electrodes exists on the insulating substrate 51, inside the electrochromic layer 54, which is provided so as to connect with the first electrode 52 and the second electrode 53, and inside the electrolyte layer 55 deposited on the electrochromic layer. The electric field 208 is also formed inside the electrolyte layer 55 through the electrochromic layer 54, and migration of lithium ions 207 occurs in the region where the potential gradient is generated from the electrolyte layer 55 with a relatively high potential to the electrochromic layer 54 with a lower potential. At the area of the electrochromic layer 54 in which lithium ions 206 are injected, coloring 209 appears. It is possible to delete this coloring 209 reversibly by stopping the applied voltage or by applying a voltage with reverse polarity for a short time.

Next, the principles of operation of the electrochromic element with the second structure constituting the information recording medium of the present invention will be described using FIG. 9. Here, an element using an electrochromic compound which is colorless in the steady state and deeply colored by doping lithium ions is also used in this description, such as poly (3,4-ethylene dioxythiophene)-polystyrene sulfonate complex and tungsten oxide. The power supply 15 is connected to the gap between the first electrode 12 and the second electrode 13 formed on the insulating substrate 11, and a voltage is applied. The applied voltage is controlled to be from 2 V to 20 V in this case. The electric field 228 generated between the electrodes exists on the insulating substrate 11 inside the electrolyte layer 104, which is provided so as to connect with the first electrode 12 and the second electrode 13, and inside the electrochromic layer 14 deposited on the electrolyte layer. The electric field 228 is also formed inside the electrochromic layer 14 through the electrolyte layer 224, and migration of lithium ions 227 occurs in the region where the potential gradient is generated from the electrolyte layer 104 with a relatively high potential to the electrochromic layer 14 with a lower potential. At the area of the electrochromic layer 14 in which lithium ions 226 are injected, coloring 229 appears. It is possible to delete this coloring 229 reversibly by stopping the applied voltage or by applying a voltage with opposite polarity for a short time.

Next, a method will be described in which the electrochromic element constituting the information recording medium is driven by applying a voltage from outside.

A constant voltage process is a process that can be easily realized. FIG. 10 shows the voltage supplied to the element and the time dependence of coloring of the electrochromic layer observed on the second electrode 3 when the element illustrated in FIG. 2 is driven under a constant voltage in the case when the electrochromic material colored by doping lithium ions is used. This element is colored when the potential of the second electrode 3 is −V (V) relative to the first electrode 2, and decolored when it is +V (V). When the coloring pulse 301 is applied to color it at time T1, the top of the second electrode becomes a colored state 303. Then, when the decoloring pulse 302 is applied at time T2, it becomes a decolored state 304. Additionally, when the coloring pulse 305 is applied again at time T3, the element is colored once again. Coloring and decoloring also can be done in the element shown in FIG. 3 by the similar pulse sequence of applied voltage Next, the principles of recording will be described using the single layer structure shown in FIG. 12. FIG. 12 shows the state in which the part 326 of the electrochromic layer is colored by applying a voltage from the power supply 327 between the first transparent electrode 322 and the second transparent electrode 323 deposited on the substrate 321. In the practical element, read/write is carried out by the laser beam 328 because the power supply 327 is not provided on the top and bottom of the medium. Either a red semiconductor laser or blue semiconductor laser is used as the laser. A blue semiconductor laser has wavelengths from 400 nm to 410 nm and has the advantage that high density recording becomes possible compared with a red semiconductor laser having wavelengths from 650 nm to 660 nm. A material in which a transmittance change of 10% or more is obtained at the emission wavelength of the laser is selected for the electrochromic material used in this example.

When a voltage is applied between the first transparent electrode 322 and the second electrode 323 using the power supply 327, ions such as lithium ions migrating in the electrolyte layer 325 along the potential gradient of the generated electric field diffuse to the electrochromic layer 326. Hereinafter, diffusing ions in the electrolyte layer 325 to the electrochromic layer 326 is called doping. The photoabsorption characteristics of the electrochromic layer 326, that is, color, are reversibly changed by voltage control. And the colored state, which is a state having absorption for the recording laser beam 328, and the decolored state, which is a state having no absorption, can be arbitrary selected. In the state having absorption for the recording laser beam 328, recording caused by generated heat, that is thermal recording, is carried out by irradiating the laser beam 328 on the irradiated region, resulting in electrochromic properties decreasing. Here, decreasing electrochromic properties means that it could originally take both states of coloring and decoloring, but it becomes not coloring. It is defined as the value obtained by subtracting the light transmittance (percentage %) of the information layer in the colored state before recording from the light transmittance (percentage %) of the information layer after recording, and is 10% or more in a constant applied voltage condition which is applied for coloring the information layer while recording. The laser beam 328 for recording may be irradiated from the side of the electrolyte layer 325 in the opposite direction. Information is recorded by laser irradiation or laser heating.

The region colored once is not colored again even in a condition which puts the non-recorded region in a colored state. Therefore, readout can be done by detecting the transmittance and reflectance of the laser beam 328 because the recorded region is not colored when a voltage is applied in the same condition as that coloring the electrochromic layer before recording using the power supply 327 between the first transparent electrode 322 and the second transparent electrode 323. Here, readout has to be carried out using a strong light intensity so as not to decrease the electrochromic properties, and it should be 30% or less of the light intensity necessary for recording. The voltage between the first transparent electrode 322 and the second transparent electrode 323, which is required to read and write, is controlled to be from 3 V to 20 V when the side of the first electrode 322 is assumed to be positive. If the polarity of the applied voltage is alternated, it is possible to color the electrochromic layer 324 on the side of the first transparent electrode 322, and it is also possible to record on this part of the electrochromic layer 324.

The electrochromic properties decrease by heat. The following four kinds of mechanisms of recording are possible.

a. the conversion ratio to the polaron state and bipolaron state by doping is reduced because of cutting conjugate groups, converting a single bond to a double bond, and oxidation of the conductive polymer in the information layer which has the electrochromic properties.

b. the electric resistivity increases locally because of a hardening reaction caused by crosslinking, polymerization reactions, and crystallization reactions in the electrolyte layer, therefore, reversible doping becomes difficult to accomplish in the information layer.

c. the chemical reaction such as heat curing occurs in the information layer and at the interface with the adjacent electrode layer, resulting in the electric resistivity increasing.

d. the chemical reaction such as heat curing occurs in the information layer and at the interface with the adjacent electrolyte layer, resulting in the electric resistivity increasing.

Recording is possible if at least one of the above-mentioned from a to d occurs. If a plurality of these things happens, higher sensitivity recording is achieved.

The information storage medium of the present invention, in a read/write device having a mechanism, which supplies a current to the information layer, is suitable for use in the form of an optical disk such as a CD-R and DVD-R. FIG. 13 is a configuration illustrating a medium at this time. Light is illustrated as irradiating from the upper side of the figure. The medium consists of the laminated protection substrate 338, protection layer 331, electrolyte layer 333, electrochromic layer 334, electrode layer 335 which is a transparent electrode, ultraviolet curable resin layer 336, laminated protection substrate 337 from the light irradiation side 341, and 339 and 340 correspond to the land part and groove part, respectively.

In the present invention, the part being a ditch in the concave portion of the substrate is called a groove. The part between grooves is called a land. In the case of so-called in-groove recording in which information is recorded on only one side of the land and groove, many cases when the information is recorded on the convex portion have better recording characteristics even if the light is irradiated from the substrate side or the side opposite the substrate. However, because it is not a big difference, it may be recorded on the concave portion as seen from the light irradiation side.

Next, the case, in which the information recording medium of the present invention is used for multi-layer optical recording will be described. As mentioned above, the present invention is suitable for multi-layer optical recording because it has one fewer transparent electrode layer compared with a conventional electrochromic element in each unit electrochromic structure.

If the unit structure shown in FIG. 13 is multiply laminated, the medium can be made higher capacity due to improvement of the recording density. It is preferable to make multi-layers to increase the effective recording density (effective surface density) in a conventional medium, but either the readout signal quality or the recording sensitivity has to be given up because the transmittance of each layer and the recording sensitivity has a trade-off relationship in the case of three or more layers. It is known that there is a medium in which the information is written in three dimensions including the thickness direction of a transparent organic material. However, the one using two-photon absorption has poor recording sensitivity and the one using photopolymerization has bad storage stability and recording sensitivity. However, in the present invention, the information layer of interest has photoabsorption and the information layer of no interest does not disturb the read/write. Because the present invention does not need a spacer layer like a conventional multi-layer DVD which performs layer selection using the focal shift of the laser beam for read or write, it is possible to arrange many layers in the depth of focus of the aperture lens and to increase the layer number and capacity than a conventional multi-layered disk. For the information layer which is not in the depth of focus, the focal position may be shifted to read/write. In this case, the pits and grooves conveying the address information may be changed by multi-layered lamination but, in some cases, it is necessary to make it possible to read the address of at least one part of the layer in the depth of focus at the moved focal position by providing again a layer, on which the pits and grooves are transcribed, for example, in the middle. A medium with the same kind of structure selected from the two kinds of structures illustrated in FIGS. 2 and 3 may be laminated to make a multi-layer, and a medium with different structures may also be combined to make a multi-layer.

In the case when the information storage medium of the present invention is used for an optical disk, the recording laser power can be controlled to be 0.2 mW or more and 2 mW or less, even under the condition of a recording line speed not lower than 15 m/s. As a result of realizing a high sensitivity in this way, a high transfer rate can be achieved without there being a power shortage even in the case of high line speed recording, since the array laser and plane-emission laser are used for the means of simultaneous photoirradiation to a plurality of positions on the information storage medium. Voltage may be simultaneously applied to at least two pairs selected from a plurality of electrode pairs of the information recording medium. This is required for the case when a material is used in which the color cannot be maintained without applying a low maintenance voltage.

When using an information storage medium having a plurality of recording layers, a voltage is applied to many electrode pairs, but it may be possible to apply a voltage different from the other electrode pairs to an electrode pair in the layer which performs the read/write. Moreover, in the case when recording transfers from one information layer to another information layer during read/write, laser irradiation for the read/write is stopped once, and the voltage applied to the electrode is changed, thereby decoloring the layer, on which the read/write has been done, and coloring the layer, on which the read/write will be newly done, is carried out.

In order to increase the speed, coloring the layer on the deeper side may be started after the read/write on the near side layer is complete and before decoloring takes place, in order to shorten the standby time for layer switching only in the case of transfer from the near side to the deeper side as seen from the read/write laser irradiation direction. As far as a device is concerned, a means is provided to position the disk electrodes to the shaft of the disk rotation motor or to the disk receiving part fixed to the shaft in such a way that the electrodes, when attaching the disk, face to each prescribed electrode on the disk receiving part, and a means is provided to contact the disk side electrodes with the electrodes of the disk receiving part. Therefore, a desired voltage can be applied to each electrode.

The present invention is effective for a recording density (track pitch, pit pitch) greater than the standard 2.6 GB DVD-RAM, and specifically it is effective for a recording density greater than the standard 4.7 GB DVD-RAM. In the case when the wavelength of the light source is not around 660 nm or the numerical aperture (NA) of the condenser lens is not 0.6, the present invention is effective for a recording density greater than the value calculated from these values using the wavelength ratio and NA ratio in both the radial and circumferential directions. And it is also effective in the case of using a blue-purple laser with an emission wavelength of about 410 nm.

According to the above-mentioned configuration, an information recording medium with excellent coloring cycle characteristics and high light transmittance can be obtained, as well as a read/write method and a read/write device using the same.

DETAILED DESCRIPTION OF THE PREFERRED EMBODIMENTS

First Embodiment (Configuration and Manufacturing Method)

Figure 1:
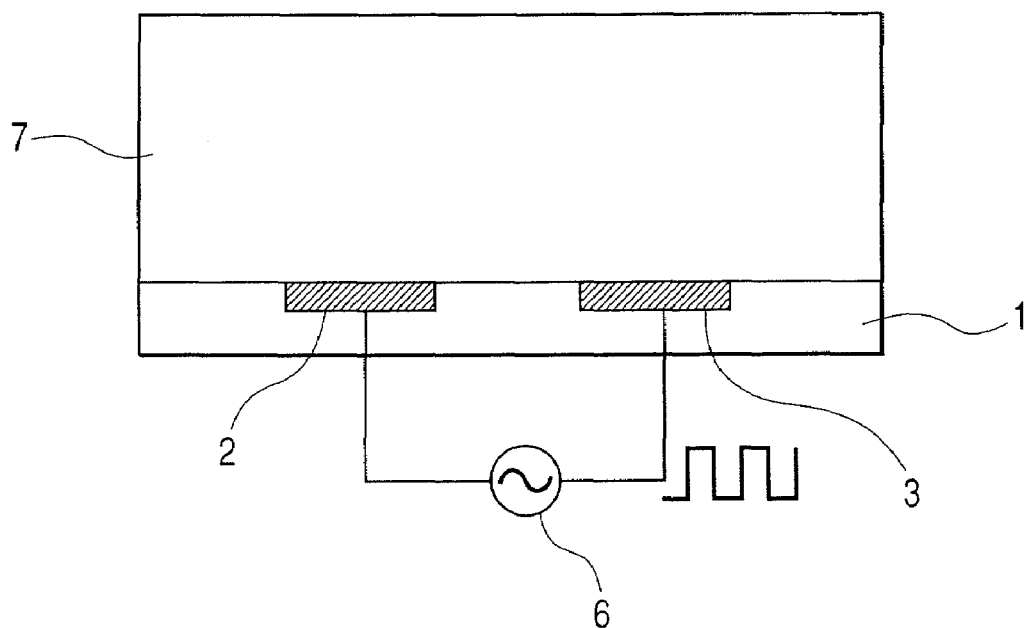
FIG. 1 is a cross-sectional view illustrating an electrochromic element constituting the information recording medium of the present invention.
Figure 2:
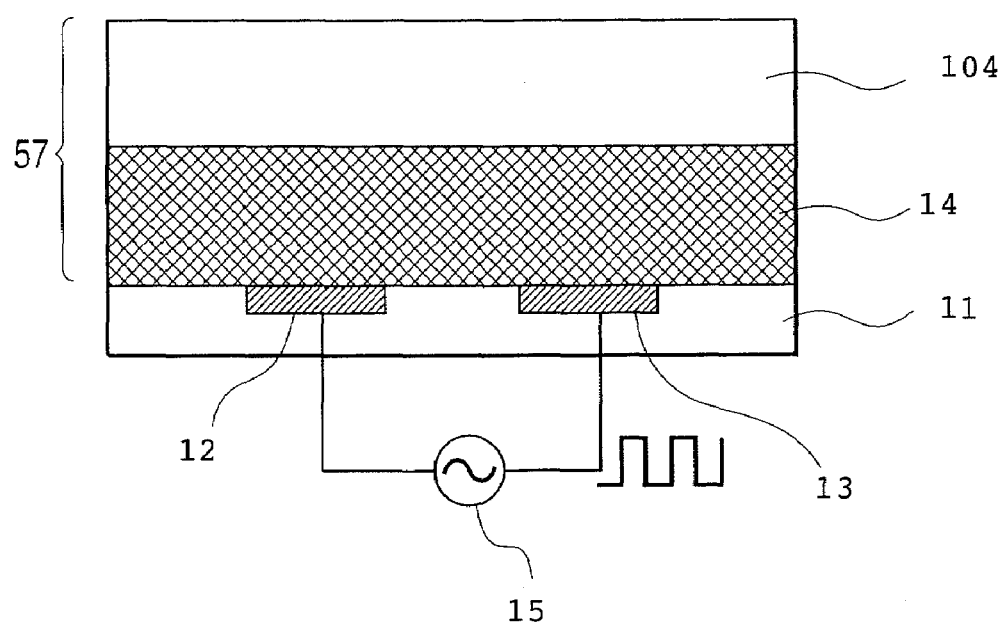
FIG. 2 is a cross-sectional view illustrating an electrochromic element constituting the information recording medium of the present invention.
Figure 3:
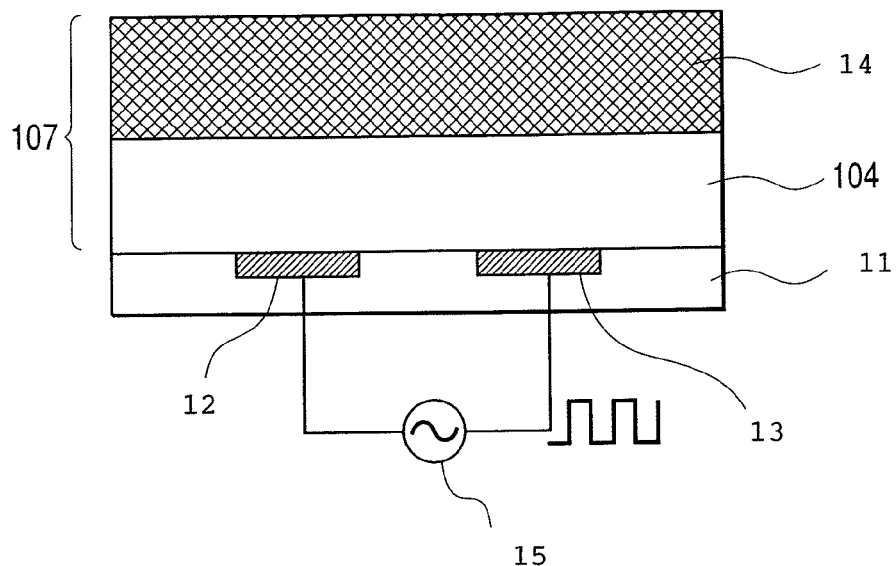
FIG. 3 is a cross-sectional view illustrating an electrochromic element constituting the information recording medium of the present invention.
Figure 4:
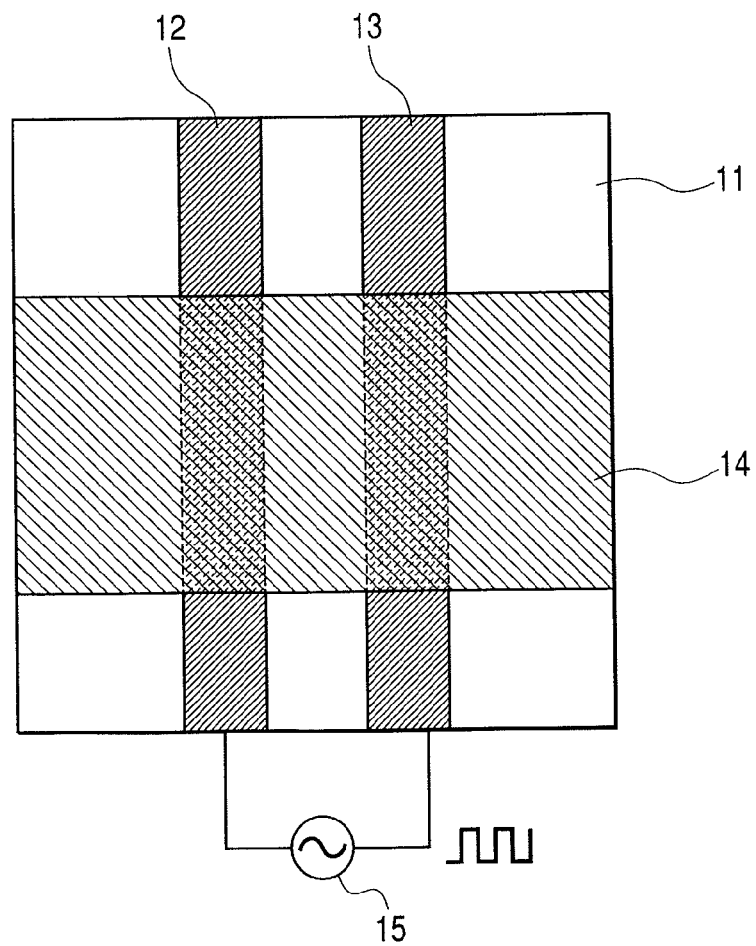
FIG. 4 is a bird's-eye view of an electrochromic element constituting the information recording medium of the present invention.
Figure 5:
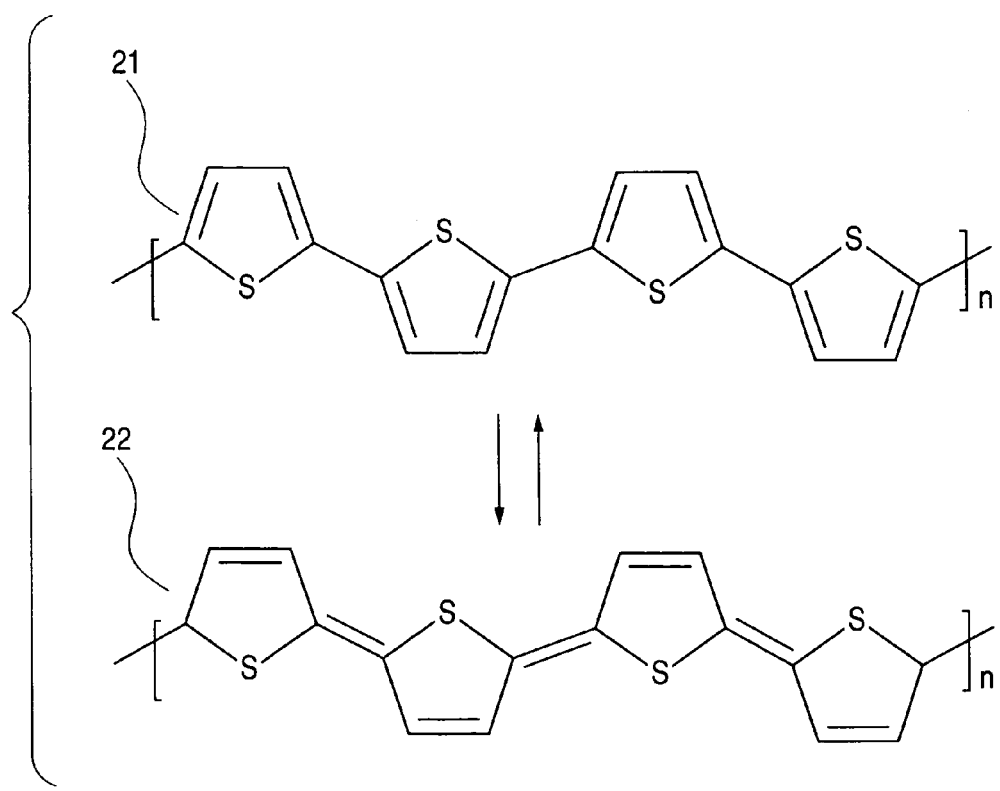
FIG. 5 shows the structure of isomers of the polythiophene.
Figure 6:
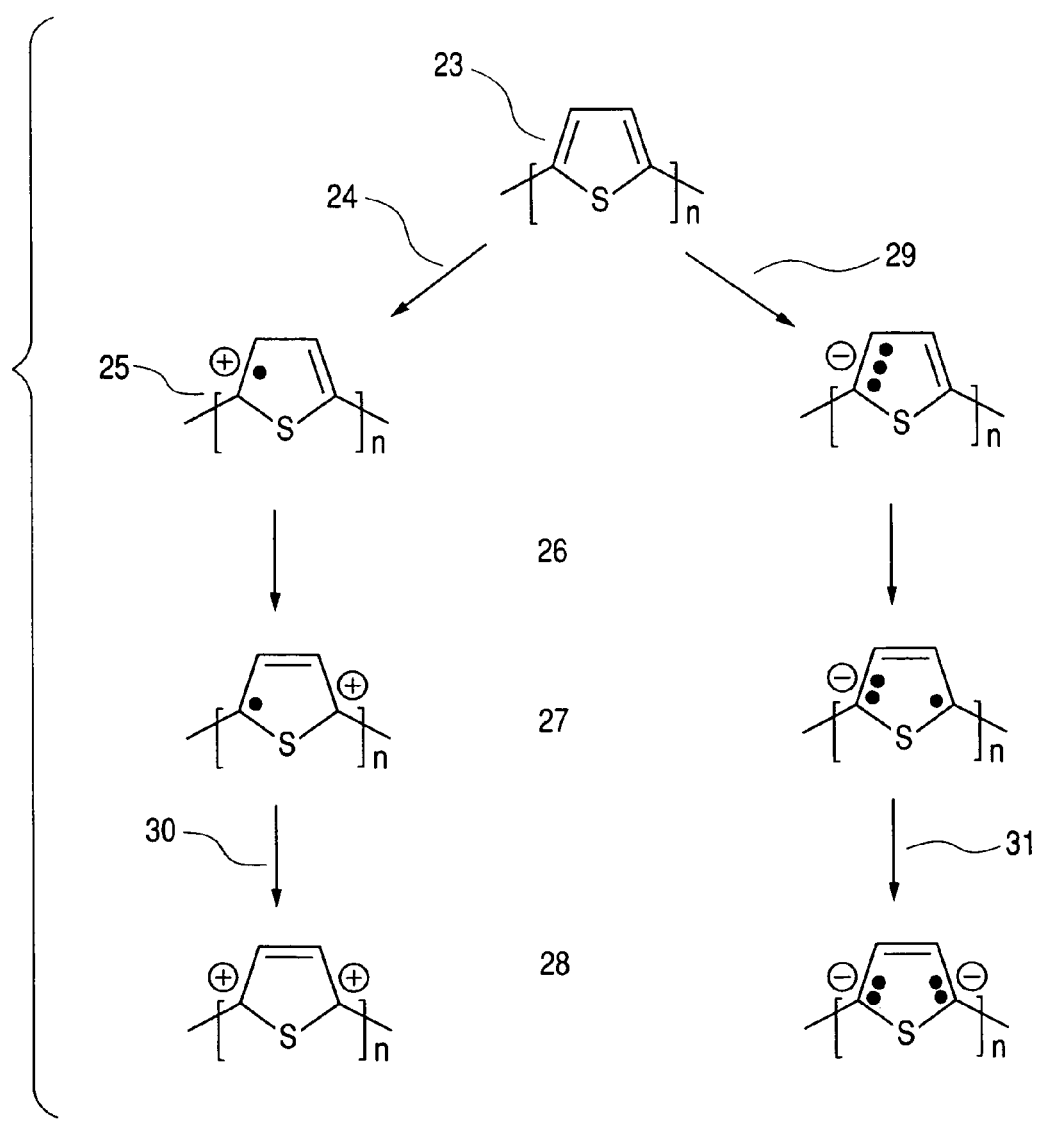
FIG. 6 explains the principle of electrochromism of the polythiophene.
Figure 7:
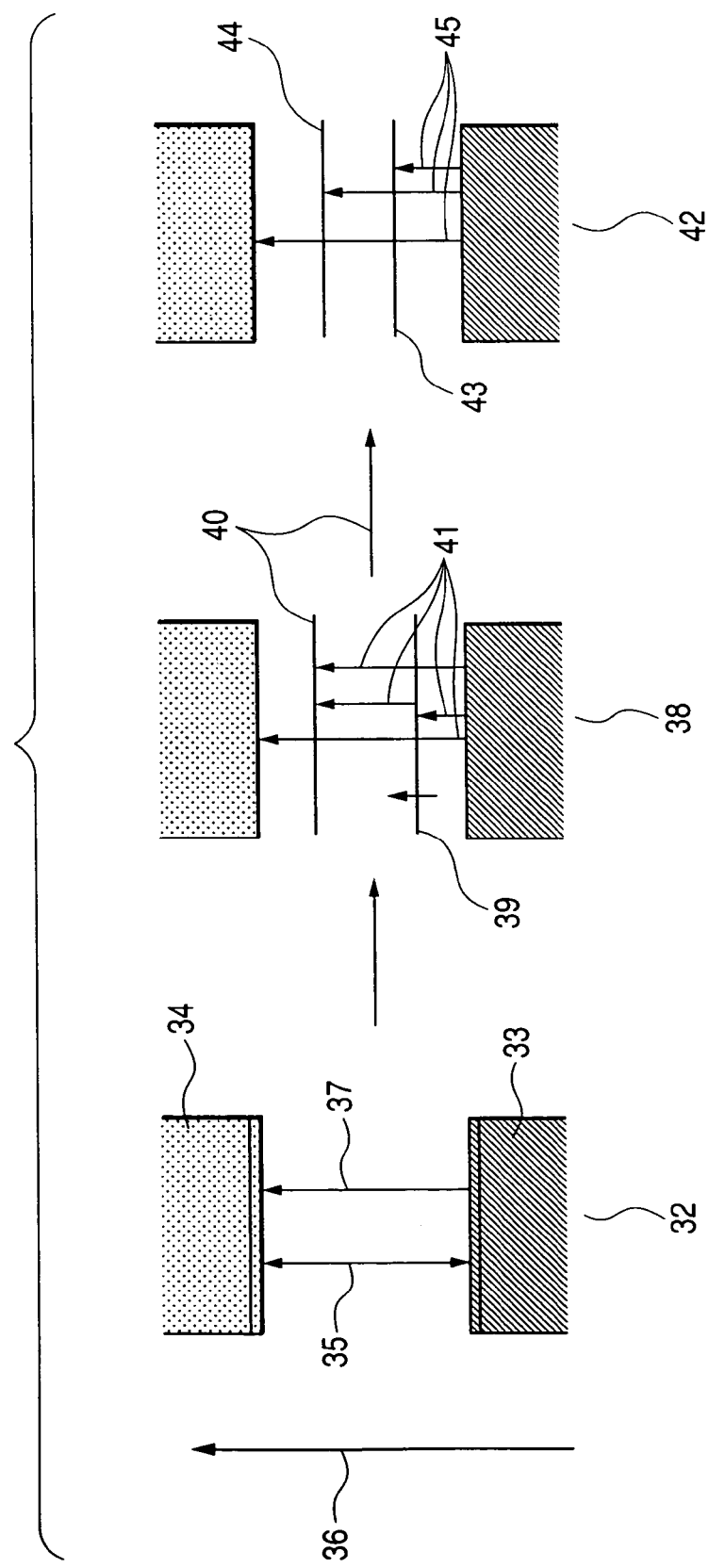
FIG. 7 explains polarons and bipolarons of the conductive polymer using the electronic band.
Figure 8:
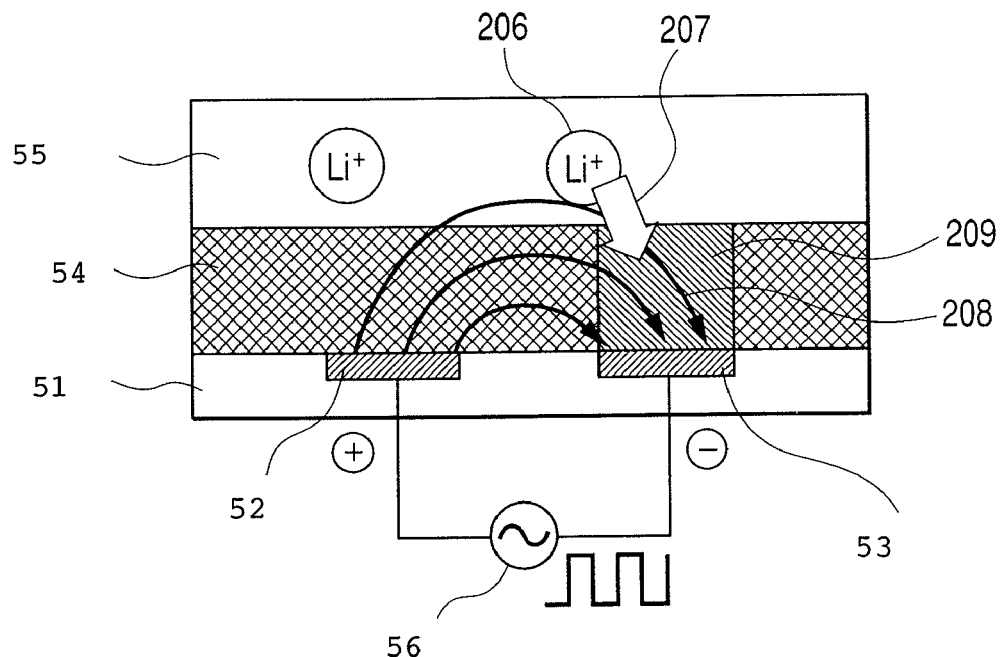
FIG. 8 shows the principle of operation of an electrochromic element constituting the information recording medium of the present invention.
Figure 9:
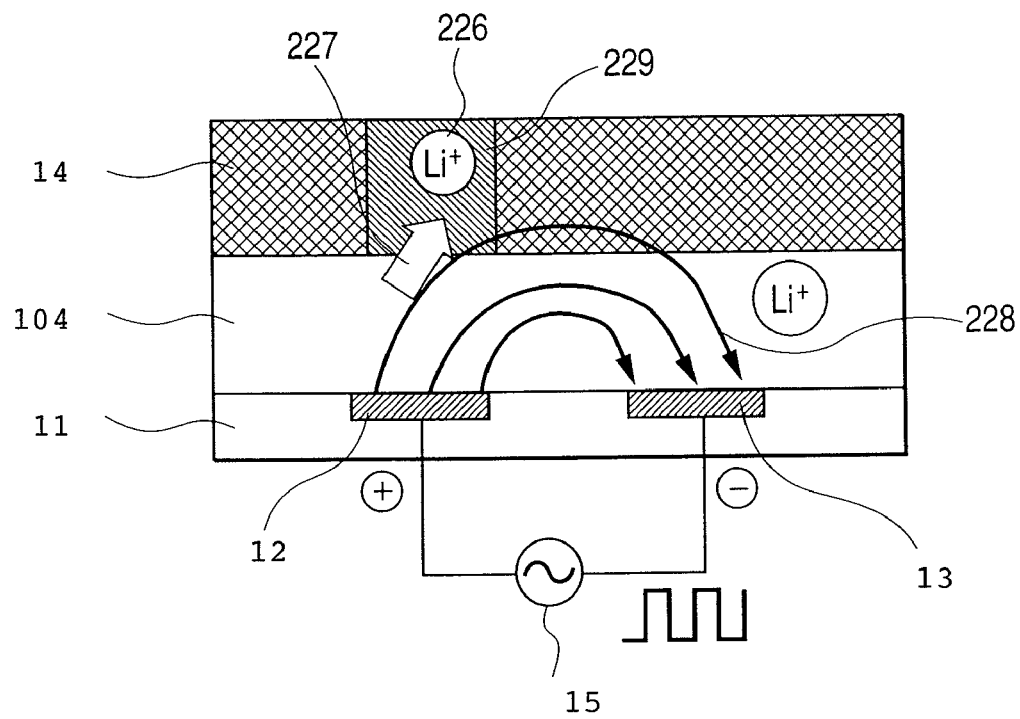
FIG. 9 shows the principle of operation of an electrochromic element constituting the information recording medium of the present invention.
Figure 10:
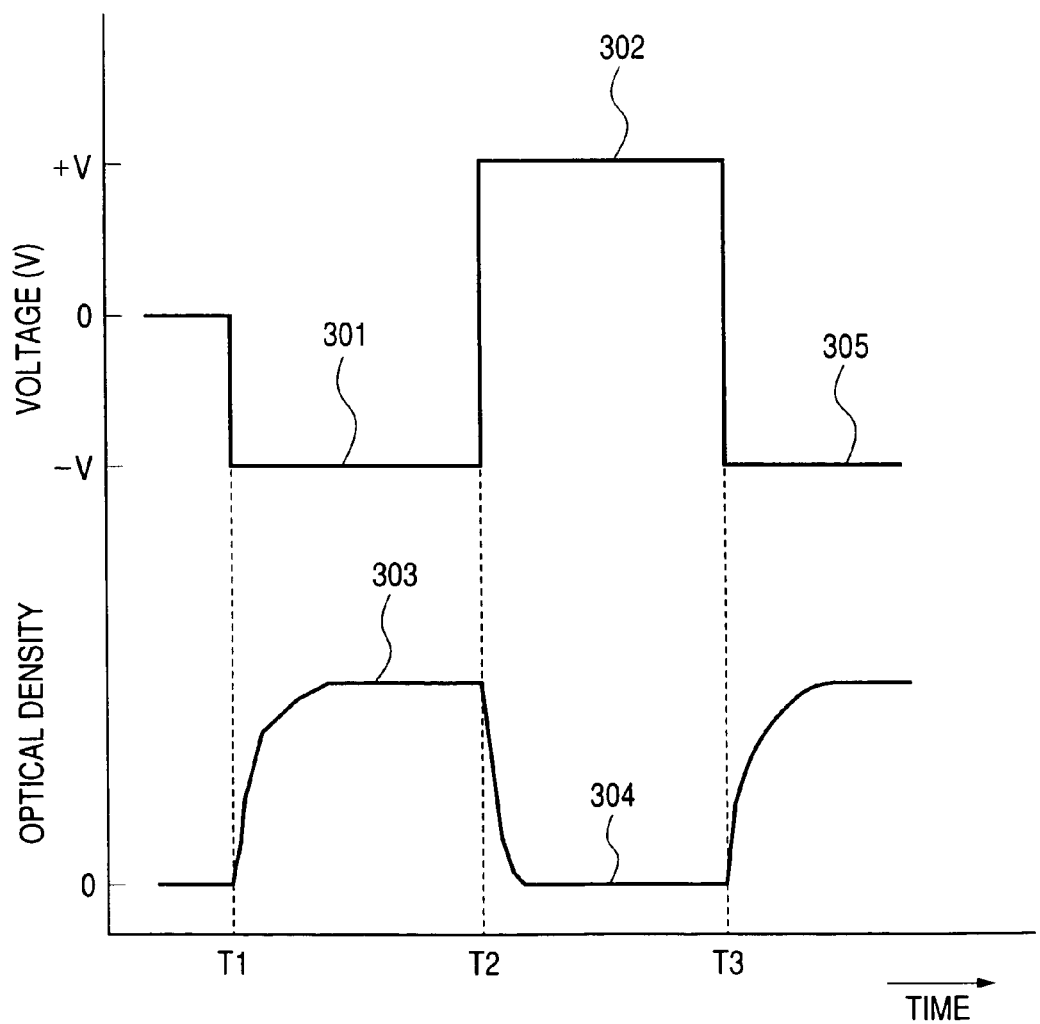
FIG. 10 shows the time scan spectra with a voltage applied to the electrochromic element constituting the information recording medium of the present invention.
Figure 11:
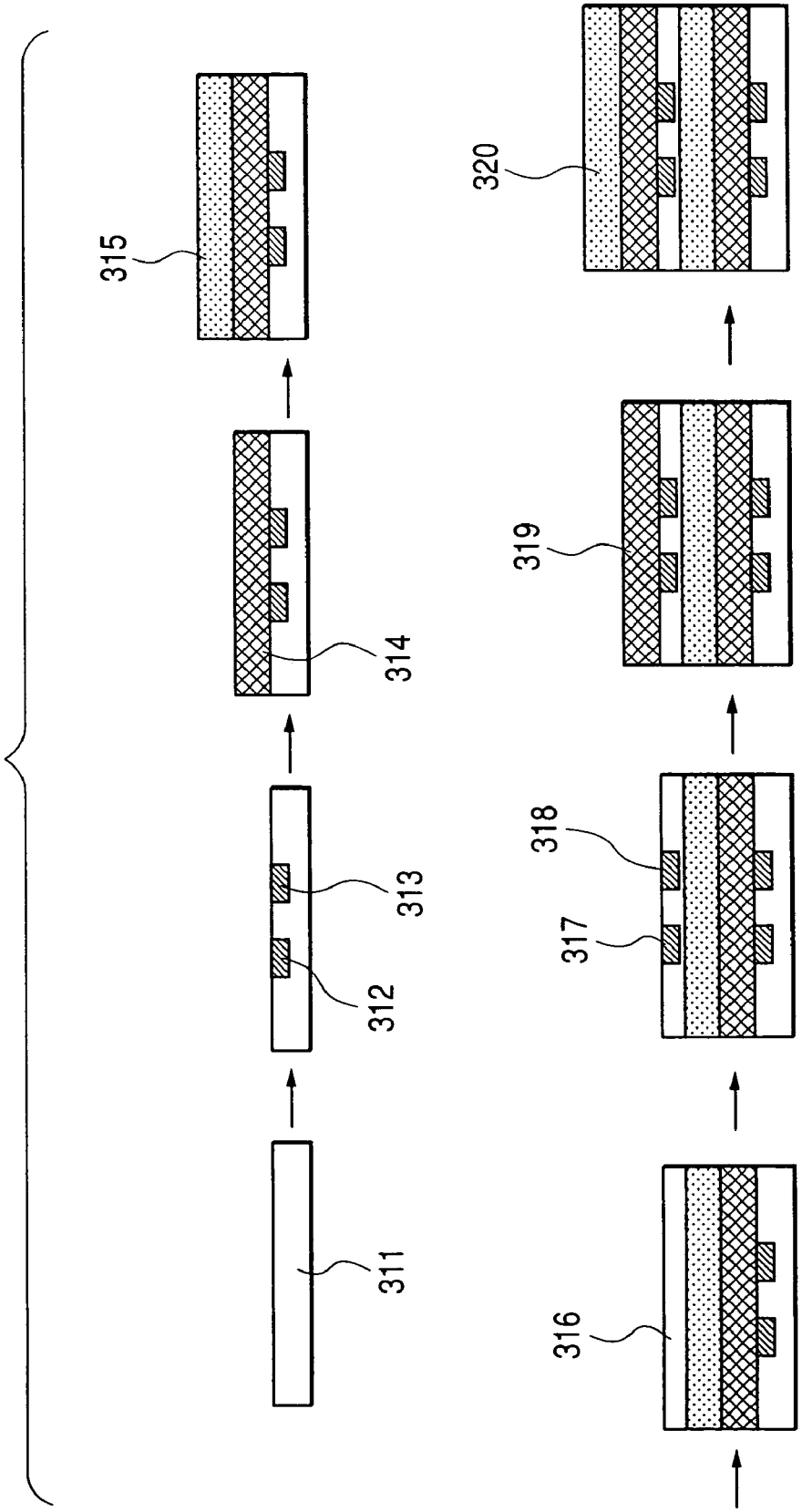
FIG. 11 shows fabrication processes of an information recording medium of the present invention.
Figure 12:
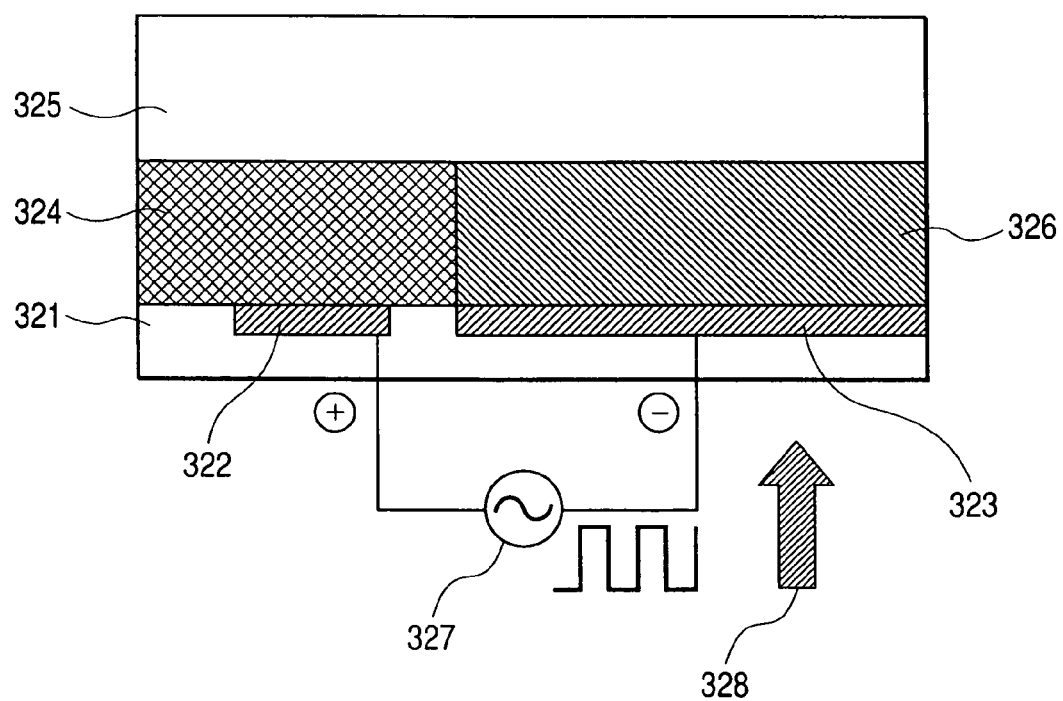
FIG. 12 explains recording on an information recording medium of the present invention.
Figure 13:
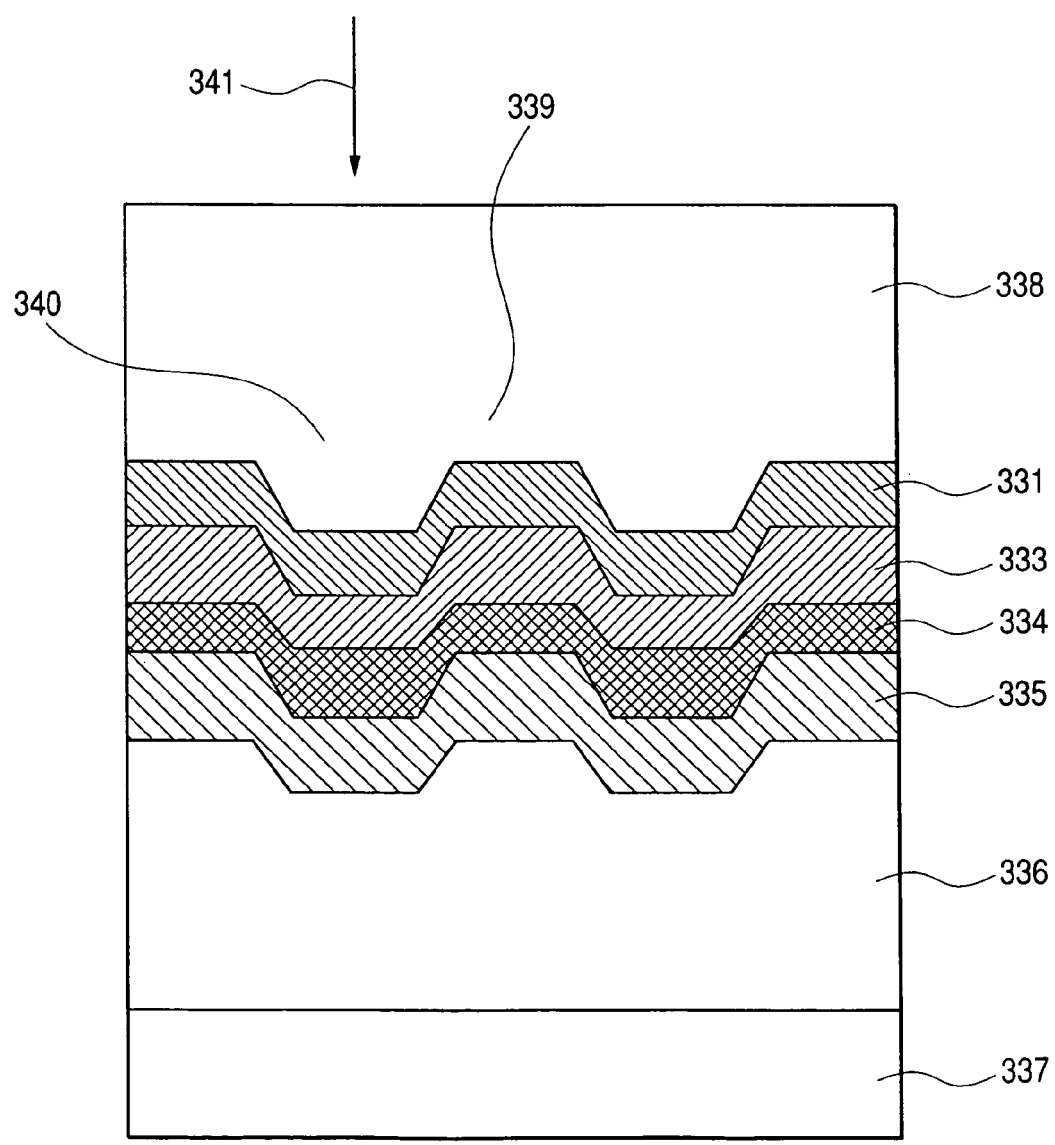
FIG. 13 is a cross-sectional view illustrating an information recording medium of the present invention.
Figure 14:
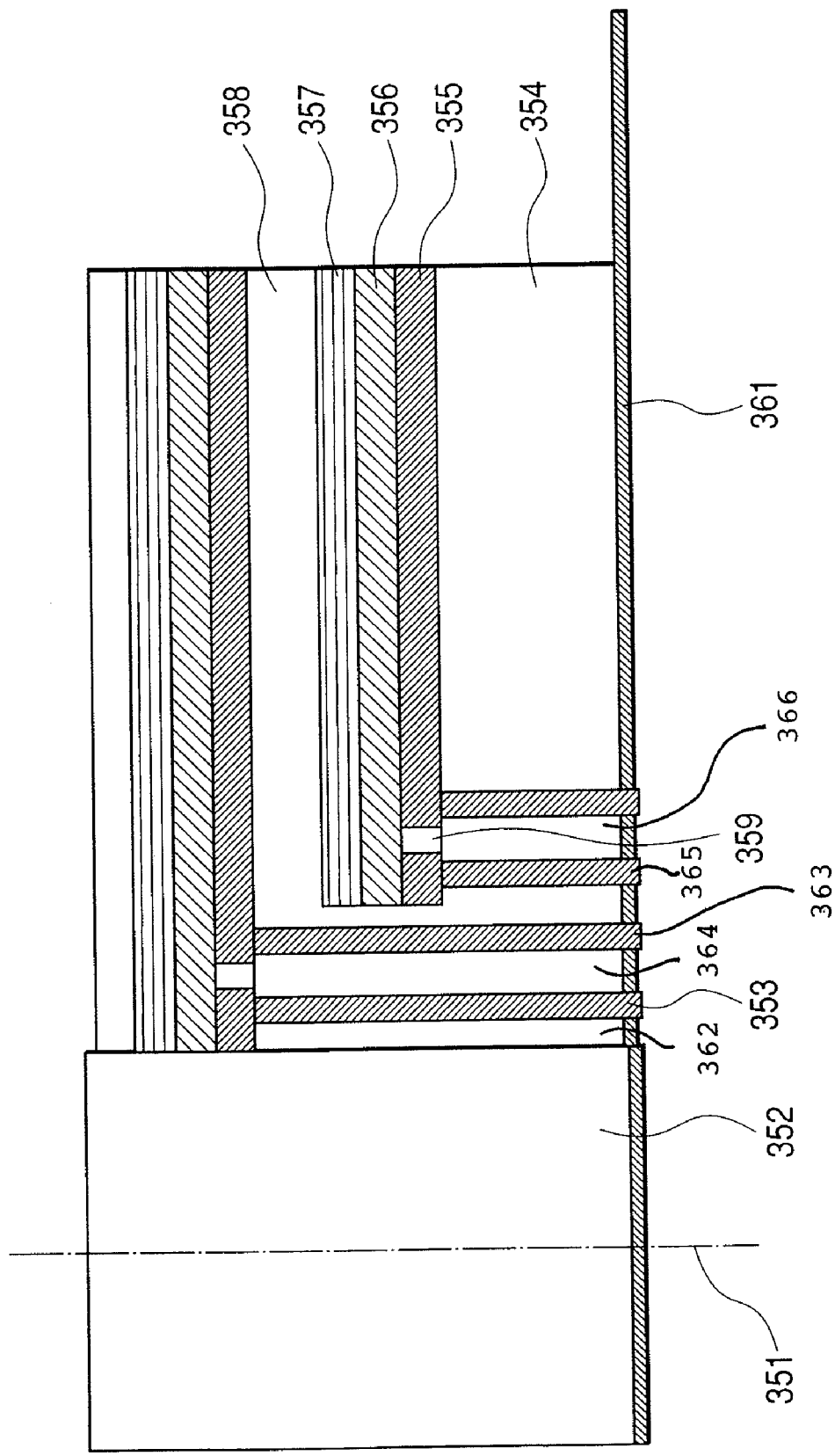
FIG. 14 is a cross-sectional view illustrating an information recording medium of the present invention.

FIG. 14 is a cross-sectional view illustrating the center part of a disk type information recording medium of the first embodiment of the present invention.

Figure 15:
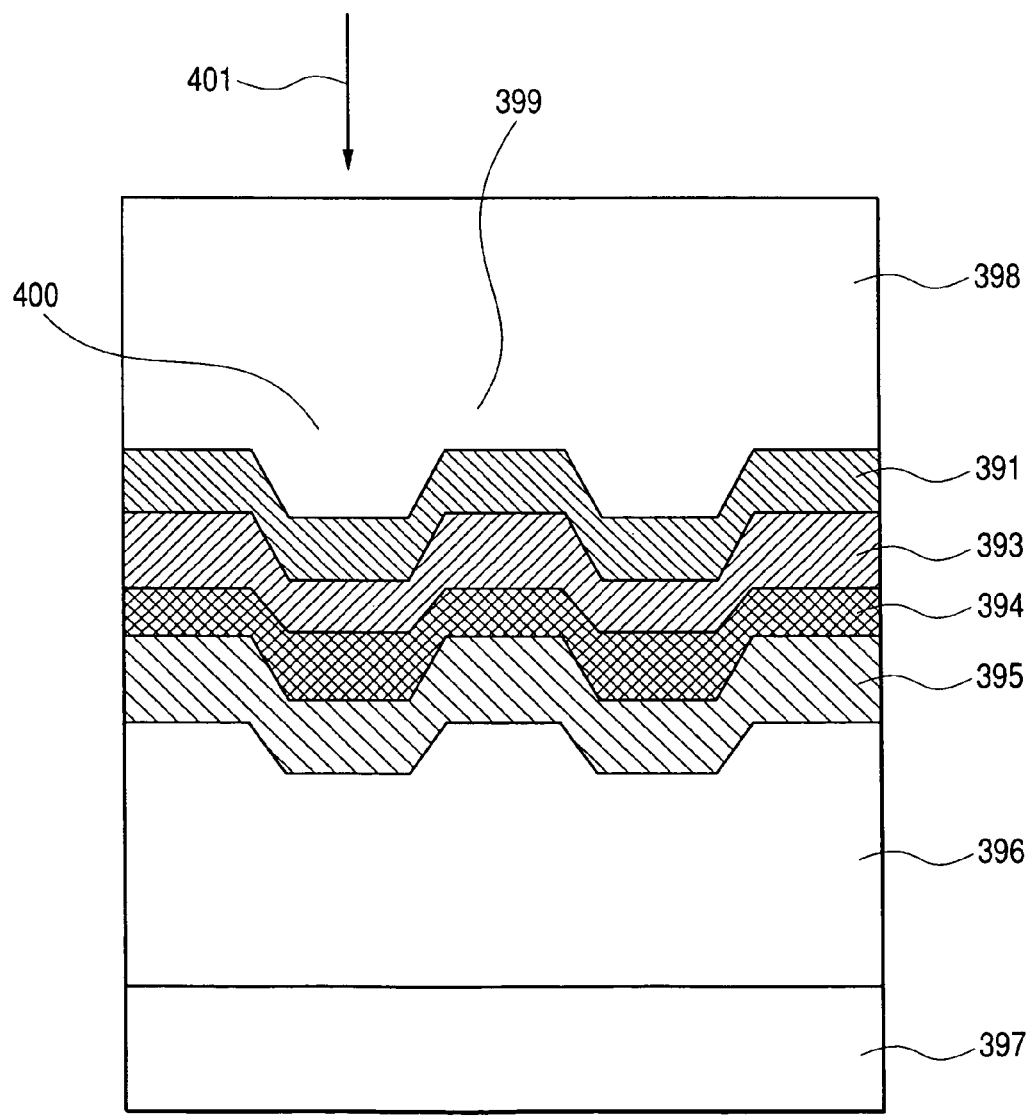
FIG. 15 is a cross-sectional view illustrating an information recording medium of the present invention.
Figure 24:
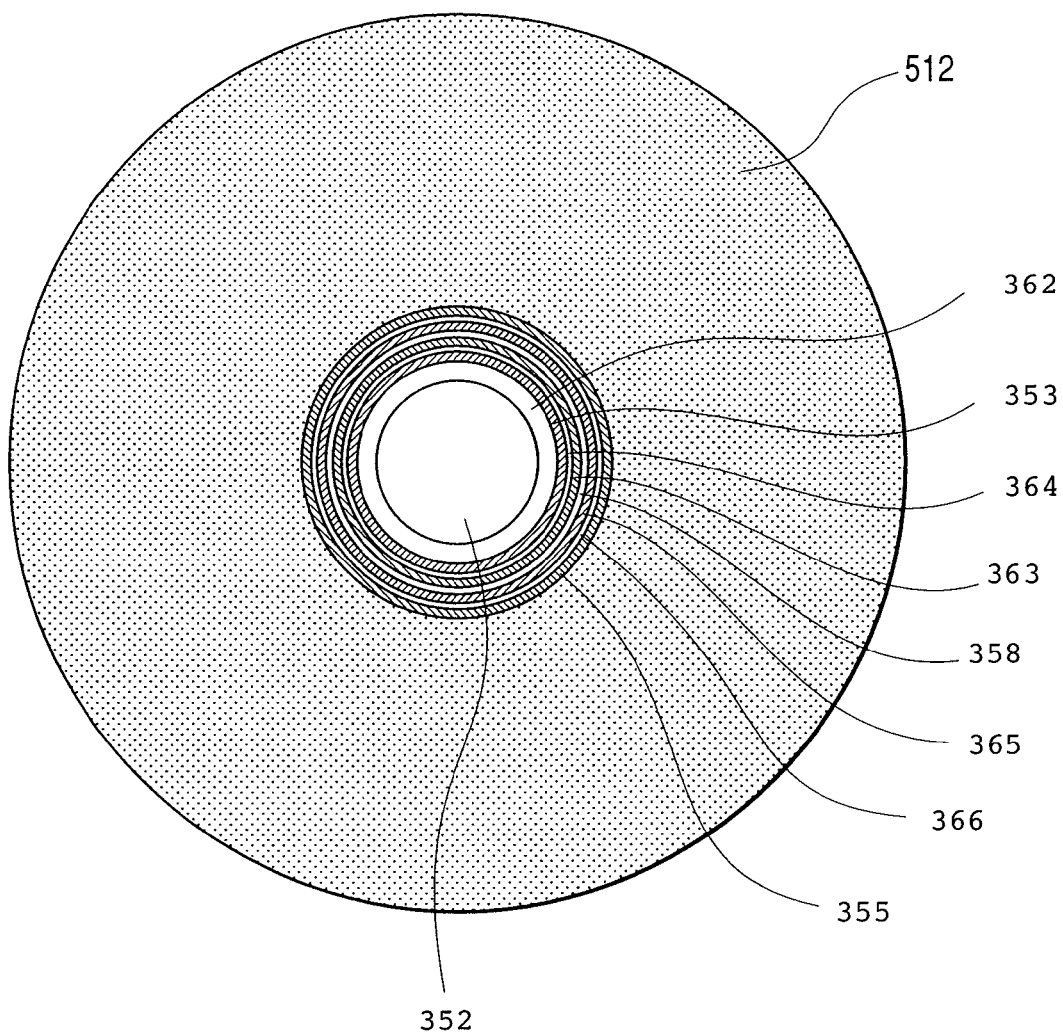
FIG. 24 is a drawing of an information recording medium seen from the bottom.

351 is the center line of the disk; 352 is the hole of the disk; 353 is the electrode connected to the electrode on the disk receiving side when it is placed in the disk receiving part and the electrode used to apply a voltage to color the electrochromic layer; 354, 362, 364, 365, 366, 359 is the insulating part consisting of polycarbonate; 355 is the transparent electrode, 356 is the electrochromic layer colored while recording; 357 is the electrolyte layer; and 358 is the insulating part to separate the transparent electrode. 360, which is the part applying a voltage from the electrode and recording by coloring, really has a land-groove structure, but it is omitted in FIG. 14. FIG. 15 is an enlarged view illustrating a part of the recording part of the disk. FIG. 24 is a view seen from the face 361 of the lower side of the information recording medium shown in FIG. 14. The information recording medium has the same shape as an optical disk 512 such as a DVD etc. and consists of the insulating part 362, electrode 353, insulating part 364, and electrode 303, in order, from the center hole part of the disk 352. The electrode 353 and the electrode 363 are separated by the insulating part 364, and they constitute a mutual pair to color and decolor the recording layer by applying a voltage. In order toward the outer edge are the insulating part 355, electrode 365, insulating part 366, and electrode 355.

The light for the read/write is irradiated from the top through the substrate. There are many cases where information is usually recorded and reproduced on the convex, so-called groove part, as seen from the beam spot, but this embodiment illustrates the case when information is recorded on the land part.

This medium is manufactured as follows.

Figure 16:
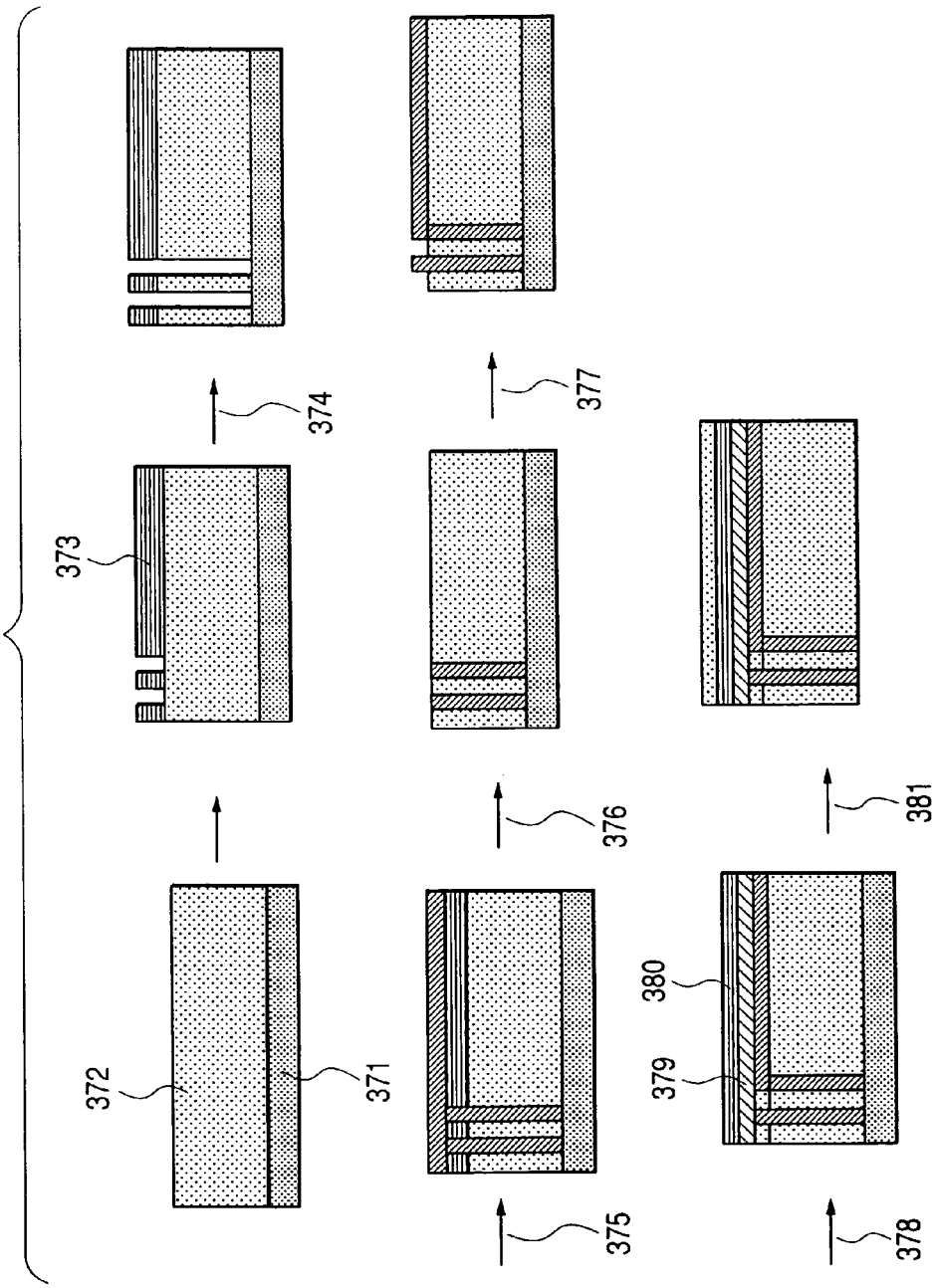
FIG. 16 shows a fabrication technique of an information recording medium of an embodiment of the present invention.

First, as shown in FIG. 16, tracking grooves (0.35 μm wide) for in-groove recording (herein, it is land recording as seen from the beam spot) with a track pitch of 0.74 μm and a depth of 23 nm are provided by molding on the surface of a dummy substrate 371 which is 12 cm in diameter and 0.6 mm thick. And, the insulating part 372 made by polycarbonate is formed with a thickness of 50 μm, on which the address is expressed by the wobble of the grooves. The positive type resist pattern 373 with a thickness of 1 μm is obtained through coating, UV exposure (248 nm wavelength) using a mask, and an alkali developer. And then, through the dry-etching process 374, the sputter process 375 for the transparent electrode with the composition of $(In_2O_3)_{90}(SnO_2)_{10}$, the lift-off resist removing process 376, and the ITO electrode formation process 377, the electrode is formed, which is used for coloring the electrochromic layer for recording. The 100 nm thick electrochromic layer 379 and the 150 nm thick electrolyte layer 380 are provided on the electrode by the electrochromic layer-electrolyte layer fabrication process 378 using a coating technique. Thereafter, a disk is similarly obtained through the fabrication process 381 for the insulating part and electrode.

The electrochromic material used for the electrochromic layer was a dispersion solution of poly (3,4-ethylenedioxythiophene)(0.5 weight %) and polyvinyl sulfonate (0.8 weight %). An acetonitrile solution of polymethyl methacrylate (number-average molecular weight of 30,000) (5 weight %), propylene carbonate (15 weight %), and lithium perchlorate (7 weight %) is used for the electrolyte layer. When a compound film is provided with a thickness from 1 to 5 nm made of $SiO_2$ and $GeO_2$, etc. which are elements having an ionic radius smaller than Li, it is desirable to be able to prevent Li from penetrating into and permeating through the transparent electrode. However, the applied voltage should be controlled to be several volts higher.

The electrode drawn out to the bottom surface of the disk is exposed on the surface, and it is matched in position with the electrode provided on the disk receiving part and made to contact each other. By combining a plurality of brushes and rings for the electrodes of the disk receiving side, electric power is supplied from the circuit board of the recording device. Other methods may be used to supply the electric power. The read/write laser beam is irradiated from the side of 401 shown in FIG. 15.

(Electrochromic Characteristics)

Figure 17:
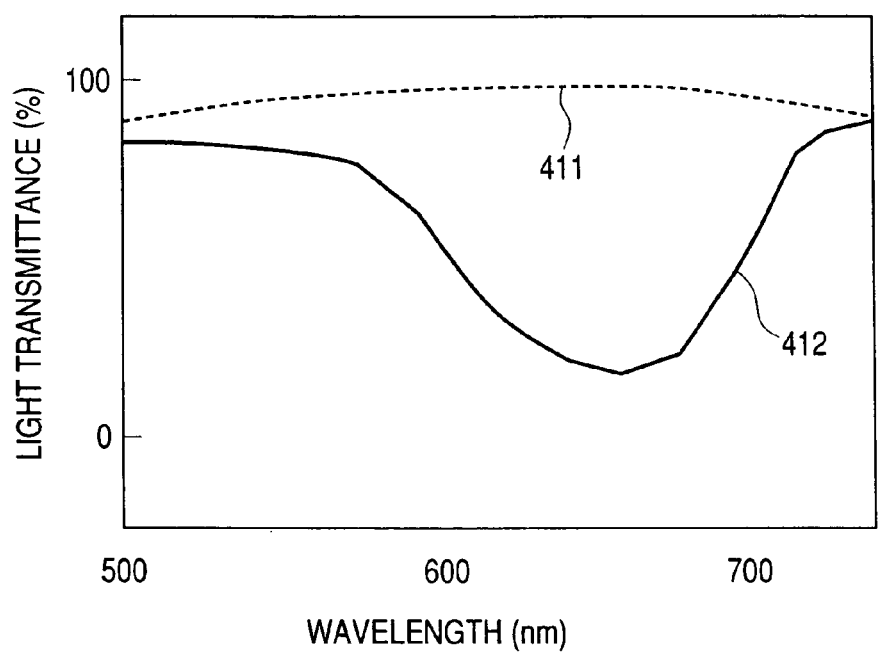
FIG. 17 shows a visible transmission spectrum of an information recording medium of an embodiment of the present invention.

The electrochromic characteristics are evaluated in the electrochromic layer of the information recording medium fabricated as mentioned above. FIG. 17 shows an absorption spectrum of a visible region (wavelengths from 500 nm to 700 nm) in the information layer. It was measured when a thoroughly stable state was reached after one minute had passed after applying a voltage between the electrodes. The direction of applied voltage is such that the electrode located at the center side of the disk is made positive. When a voltage was not applied as shown by the dotted line 411 in FIG. 17, it was almost completely clear in the wavelength from 550 nm to 700 nm, but, when +3.0 V was applied, an absorption band with a peak at a wavelength of 660 nm appeared as shown by the solid line 412. The transmittance at this wavelength of 660 nm was 30%.

Figure 18:
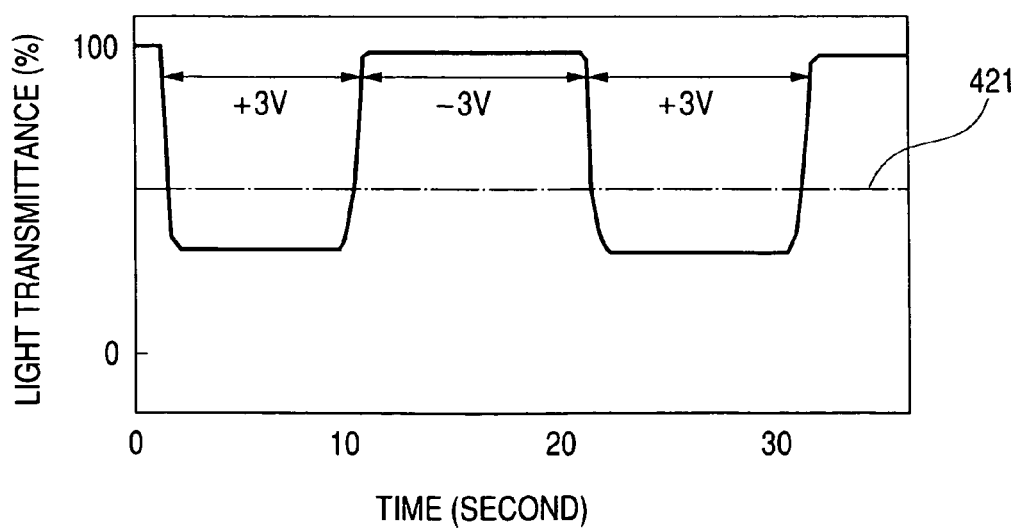
FIG. 18 shows the coloring response following an applied voltage to the information recording medium of an embodiment of the present invention.

FIG. 18 shows the time scan spectra of the information layer at a wavelength of 660 nm according to switching the applied voltage between +3 V and −3V. The voltage was switched every 10 seconds. The broken line 421 shows the light transmittance of 60% which is the minimum coloring concentration required for the read/write, that is, it indicates that the coloring concentration of the information layer of the fabricated information storage medium is sufficient. The time to reach the coloring concentration necessary to read/write from the decoloring state and the time necessary to return to the decoloring condition from the coloring condition are both about one second.

(Read and Write)

Read/write information is done on the above-mentioned information storage medium. Read/write operation of this information will be explained using FIG. 19 as follows. First, the one adopting the ZCAV (Zoned Constant Linear Velocity) method is described as a motor controlling technique for read/write, in which the rotation speed of the disk is changed in every zone performing read/write.

Figure 19:
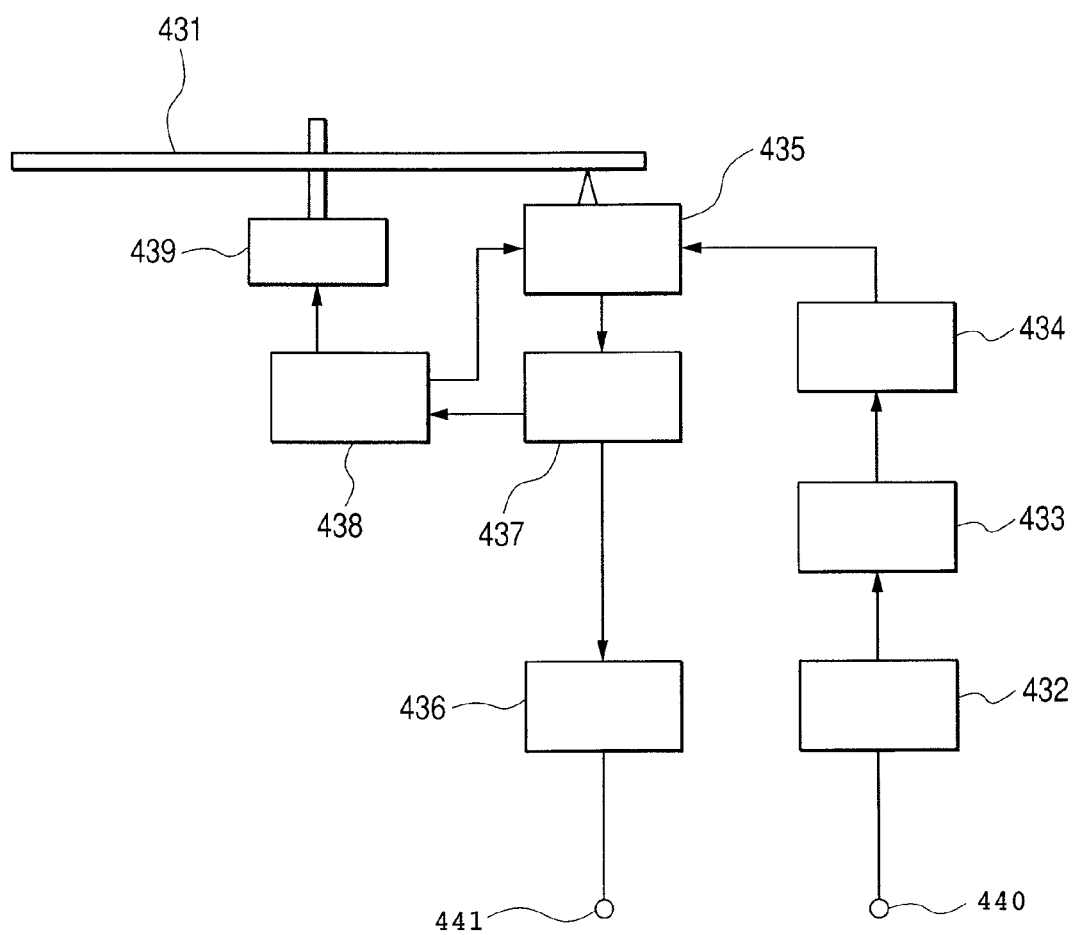
FIG. 19 is a block diagram illustrating an applied voltage control circuit of an embodiment of the present invention.

In FIG. 19, 437 is the preamp circuit, 438 is the L/G servo circuit, 439 is the motor, 440 is the input signal, and 441 is the output signal.

Information from outside the recording device is transferred to the 8-16 modulator 432 in 8-bit units. When the information is recorded on the information recording medium (hereinafter called an optical disk) 431, recording is carried out using the modulation method converting the 8-bit information to 16 bits, the so-called 8-16 modulation method. With this modulation method, information corresponding to 8-bit information with a mark length of 3 T-14 T is recorded on the medium. The 8-16 modulator 432 in this FIG. performs this modulation. Here, T means the clock cycle during information recording. The disk is rotated to make the speed relative to the beam spot become a line speed of about 8 m/s. The digital signal of 3 T-14 T converted by the 8-16 modulator is transferred to the record waveform generating circuit 433, and a multi-pulse record waveform is created.

In this case, the power level to form the recording mark, the intermediate power level to be able to delete the recording mark, and the lowered power level being are controlled to be 5 mW, 2 mW, and 0.1 mW, respectively. The laser power for forming the recording mark could be lowered by increasing the applied voltage, and excellent recording could be done within the range from 0.5 mW to 5 mW.

Even when the line speed was changed from 8 m/s, this range did not change so much. Reading was carried out with 1 mW without applying the voltage. Practical reading could be done within the range from 0.2 mW to 2 mW. Deterioration in the recorded data was observed when it was read for a long time with a power exceeding 2 mW. Moreover, in the above mentioned record waveform generating circuit, the signals with 3 T-14 T are made to alternately correspond to "0" and "1" in the time series. In this case, the electrochromic characteristics are deteriorated at the area to which the high power level pulse is irradiated, and coloring does not occur easily. Moreover, in the above-mentioned record waveform generating circuit 433, there is a multi-pulse waveform table corresponding to the method (adaptive record waveform control), in which the first pulse width and the last pulse width of the multi-pulse waveform are changed corresponding to the length of space part before and after the mark part, when a string of high power pulse lines is formed to create the mark part. Thereby, the multi-pulse record waveform is generated in which the effect of the thermal interference generated between the marks can be eliminated as much as possible.

The record waveform created by the record waveform generating circuit 433 is transferred to the laser driving circuit 434, and the semiconductor laser in the optical head 435 is irradiated according to this record waveform by the laser driving circuit 434. The semiconductor laser with a light wavelength of 660 nm is used as the laser beam for information recording in the optical head 435 mounted in the recording device of the present invention. Moreover, information was recorded by stopping down the laser beam on the information layer of the above-mentioned optical disk 160 with the object lens of lens NA0.65 and irradiating the laser beam.

Furthermore, in the case when a conductive polymer electrochromic material is used for the information layer, the radiation coefficient of the medium is higher in the colored state, and the radiation coefficient of the area, which is recorded and not colored, is lower. While recording by laser beam irradiation, a voltage of 3 V is applied continuously. Moreover, a contrast ratio of about 2:1 of the light radiation coefficient was obtained in the recording mark and other parts in the recording medium of this embodiment. When the contrast ratio becomes this or less, fluctuations caused by readout signal noise exceeds the upper limit of 9%, departing from the region of practical readout signal quality.

When $SiO_2$ was added to the transparent electrode to make $(SiO_2)_{40}(In_2O_3)_{55}(SnO_2)_5$, the refractive index of the electrode layer decreased, becoming optically advantageous, and the contrast ratio could be made 2.5:1.

Recording simultaneously to the same or separate recording tracks could be easily carried out by forming a plurality of light spots from a single optical head or a plurality of optical heads. This recording device corresponds to the method of recording information to the land (so-called irregular type of in-groove recording method) out of the groove and land.

Reproducing the recorded information is carried out by using the above mentioned optical head. The reproducing signal is obtained by irradiating the laser beam on the recorded mark and detecting the reflected light from the mark and the parts other than the mark. The amplitude of the reproducing signal is amplified by the preamp circuit and converted every 16 bits to 8-bit information in the 8-16 demodulator 436. Reproducing the recorded mark is completed by the operation mentioned above.

In the case when the mark edge recording is carried out in the aforementioned condition, the mark length of the 3 T mark being the shortest mark becomes about 0.20 μm and the mark length of the 14 T mark being the longest mark becomes about 1.96 μm. The dummy data of the repetition of the 4 T mark and 4 T space are included in the recording signal at the leader and the trailer of the information signal. VFO is also included in the leader.

(Mark Edge Recording)

The mark edge recording method is adopted in a DVD-RAM and DVD-RW, in which high density recording can be achieved. Mark edge recording is one in which the position of both recording mark edges formed on the recording film correspond to the digital data of 1, therefore, it is possible to achieve high density with the shortest recording mark length corresponding to 2-3 standard clocks, not one. DVD-RAM uses the 8-16 modulation method and corresponds to three standard clocks. The mark edge recording method has an advantage in which a high density recording is possible to achieve even if the recording mark is made externally small compared with the mark position recording where the center position of the disk recording mark corresponds to the digital data of 1.

The shape distortion of the recording mark is required to be small for the information recording medium.

(ZCLV Recording Method and CAV Recording Method)

It is preferable for the information recording medium using the electrochromic material to record with an optimized line speed in order to obtain excellent read/write properties when the recording waveform is not changed. However, it takes a long time to change the rotation speed to make the line speed the same while accessing between the recording tracks at different diameters on the disk. Therefore, the ZCLV (Zoned Constant Linear Velocity) method is used for a DVD-RAM, in which the radial direction of the disk is separated into 24 zones so as not to decrease the access speed, a constant rotation speed is kept in a zone, and the rotation speed is changed only when it has to access different zones. In this method, the recording densities are slightly different because the line speeds are slightly different between the outermost track and the innermost track in the zone. However, it can record with almost maximum density by extending to the whole area of the disk.

On the other hand, the CAV recording method which has a constant rotation speed is preferable due to the good point that the rotation speed does not have to be changed even if accessing widely in a radial direction. Because it can limit power consumption while changing rotation speed, it is suitable also for mobile devices. Since a constant heating time can be obtained in the present invention without depending on the radial position as already described, it has the effect of facilitating CAV recording.

(Electrode Material)

Optical characteristics in which there is no absorption in the wavelength of the recording laser beam, that is, transparent, is important for the electrode material. A material with the composition of $(In_2O_3)_x(SiO_2)_{1-x}$, where x is within a range from 5% to 99%, can be used for the transparent electrode. Specifically, from the point of view of electric resistivity, materials can be used in which the x value is within the range from 90% to 98%, to which 50 mol % or less of $SiO_2$ is added, and other oxides such as 2 to 5 mol % of $Sb_2O_3$, etc. are added to $SnO_2$.

Moreover, fluorine-doped $SnO_2$ has a high electric resistivity as well as high light transmittance, so that it is possible to be used. Or, because IZO (indium zinc oxide) has the advantage that it can be fabricated with less surface roughness, it can be used for the electrode. A high transparency is not always required for the electrode placed at the deeper side as seen from the irradiation side of the laser beam to the information storage medium, so that metals preferable for optical disks can also be used. A metallic layer which has a high radiation coefficient and thermal conductivity is preferable because it is effective in preventing temperature rise at the substrate surface. In the case of Al or an Al alloy, it should be a high thermal conductivity material including 4 atomic % or less of added elements such as Cr, Ti, etc. Next, the layer may be used in which a single element selected from Au, Ag, Cu, Ni, Fe, Co, Cr, Ti, Pd, Pt, W, Ta, Mo, Sb, Bi, Dy, Cd, Mn, Mg, and V, or an alloy including these materials as a main component such as a Au alloy, Ag alloy, Cu alloy, Pd alloy, Pt alloy, Sb—Bi, SUS, Ni—Cr or an alloy of these elements. Thus, electrode and reflection layer consist of metallic elements, semiconductor elements, and alloys and mixtures thereof. Among these, single elements of Cu, Ag, and Au or Cu alloys, Ag alloys, specifically ones with 8 atomic % or less of added elements such as Pd and Cu, etc. and ones having a high thermal conductivity such as Au alloys etc. suppress heat deterioration of the organic materials. Conductive organic materials which have no absorption band in the visible region can also be used, such as polythiophene derivatives, polypyrrole derivatives, and polyacetylene, etc. which have narrow band gap structure.

(Substrate)

A polycarbonate substrate having grooves for tracking directly on the surface is used in this embodiment. A substrate having grooves for tracking means a substrate which has grooves deeper than $\lambda/15n$ (where n is the refractive index of the substrate material) when the read/write wavelength is $\lambda$. The grooves may be formed continuously per revolution or divided midway. It is understood that the balance of tracking and noise is good when the groove depth is about $\lambda/12n$. Moreover, the groove width may be different depending on the location. A substrate which has the format to be able to read/write on both the groove part and land part or to read/write on either of these may be used. In the case of a type recording only on the groove, it is preferable that the track pitch is about 0.7 times the wavelength/NA of aperture lens, and the groove width about ½ of it.

(Recording Laser Power)

In this embodiment of the information storage medium, the recording laser power is controlled to be 10 mW in the condition, for instance, of a recording line speed of 8 m/s or high.

(Reading Laser Power)

The reading laser power is controlled to be 1 mW. The laser transmission speed can be made four times faster when, for instance, a 4-element array laser is used for the laser source.

(Electrochromic Material)

Read/write could be performed in the case when poly (3,4-ethylenedioxypyrrole), poly (3-hexylpyrrole), and tungsten oxide are used as the electrochromic material used for the recoding layer. However, as for the conductive polymer electrochromic material, polythiophene and polythiophene derivatives are more efficient, which easily accept donor doping, for instance, $Li^+$, and have more excellent stability against oxidization in the neutral condition. In stead of poly (3,4-ethylenedioxypyrrole), an information storage medium using polythiophene, poly (3,4-propylene dioxythiophene), poly (3,4-dimethoxythiophene), and poly (3-hexylthiophene) could be similarly used for the read/write.

(Material for the Electrolyte Layer)

As the polymer used for the electrolyte layer, in lieu of poly (methyl methacrylate), an information storage medium using polyethylene oxide, polypropylene oxide, a copolymer of ethylene oxide and epichlorohydrin (70:30), polyethylene carbonate, polypropylene carbonate, and polysiloxane could be similarly used for the read/write. As the electrolyte salt, in stead of lithium perchlorate, an information storage medium using lithium triflate, lithium hexafluorophosphate, lithium tetrafluoroborate, and N-lithiotrifluoromethane sulfonimide could be similarly used for the read/write.

First Comparative Example

Figure 23:
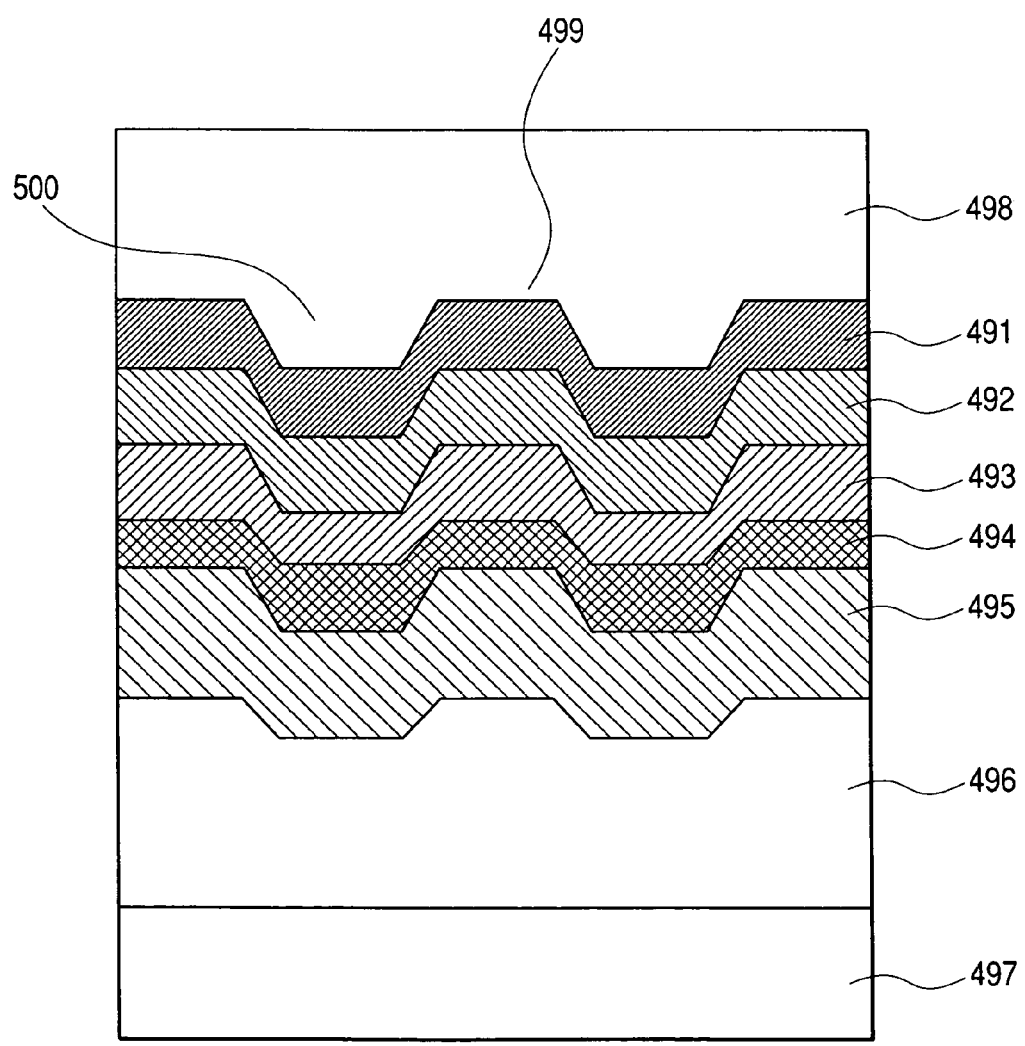
FIG. 23 is a cross-sectional view illustrating an information recording medium of an embodiment of the present invention.

Using the same materials and method as the first embodiment, an optical disk having a cross-sectional view of the recording part is fabricated, which is a well known electrochromic element structure as shown in FIG. 23. The electrode layer 495 of this optical disk, which is a transparent electrode, is deposited on the electrochromic layer 494 by a magnetron sputtering process.

There is one extra electrode layer in this optical disk compared with the structure illustrated in FIG. 15 of the first embodiment. The light transmittance of the electrode layer in the optical disk of the comparative example was 84.6%. Because the light transmittance of the electrode layer was 92%, it is understood that the information recording medium described in the first embodiment of the present invention has a greater light transmittance and the optical efficiency becomes greater.

Figure 31:
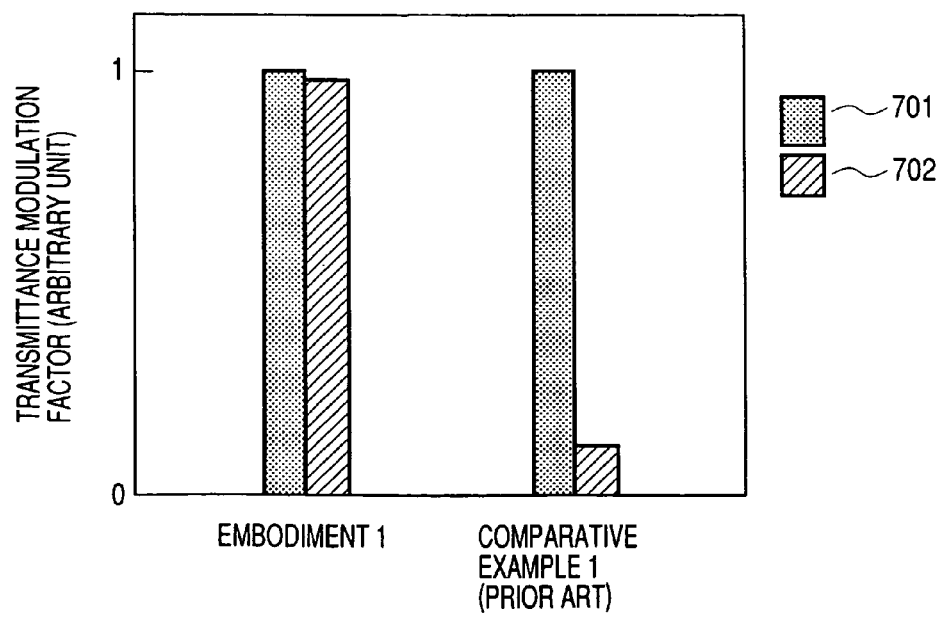
FIG. 31 shows a comparison of deterioration level between an information recording medium of an embodiment of the present invention and a conventional recording medium.

The effect of the optical disk with the structure of the present invention is not only the improvement of the light transmittance. FIG. 31 shows a comparison of the initial value 701 and the transmittance modulation factors 702 after 1000 coloring cycles, in which the absolute values of the difference of the light transmittance (transmittance modulation factor) are normalized by the initial value of the coloring cycle (second time) (it is called the initial value) when the optical disks of the first embodiment and the first comparative example are colored by an applied voltage of 5 V and decolored by an applied voltage of −1 V. Although no deterioration is observed in the optical disk of the first embodiment even after 1000 coloring cycles, the optical disk of the first comparative example exhibits deterioration where the transmittance modulation factor is reduced to 10% of the initial value after 1000 cycles.

Furthermore, the optical disk of the first embodiment could be used to read/write after 10000 coloring/decoloring cycles of the electrochromic layer. On the other hand, the optical disk of the first comparative example could not read/write after 100 coloring/decoloring cycles. This was because the electrochromic layer was deteriorated by depositing the electrode layer on the electrochromic layer using a sputtering method in the optical disk of the comparative example. It is clear that, regarding disk durability, the optical disk of the first embodiment is superior to the optical disk of the comparative example.

Second Embodiment

This embodiment relates to an information recording medium in which it was made possible to use a short wavelength laser for the read/write. The structure and fabrication method are the same as those of the first embodiment. A dispersion solution of poly (3,4-dimethoxythiophene) (0.5 weight %) and polyvinylsulfonate (0.8 weight %) was used for the electrochromic layer. A cyclohexanone solution of polymethyl methacrylate (number average molecular weight: 30,000) (5 weight %), propylene carbonate (15 weight %), and lithium perchlorate (7 weight %) was used for the electrolyte layer. A reflection layer consisting of a $W_{80}Ti_{20}$ film was formed with a 50 nm in thickness on the electrolyte layer. The laminated film was fabricated using a magnetron sputtering system. A protection layer with a 0.5 μm in thickness was formed on the second electrode using a UV resin.

Figure 20:
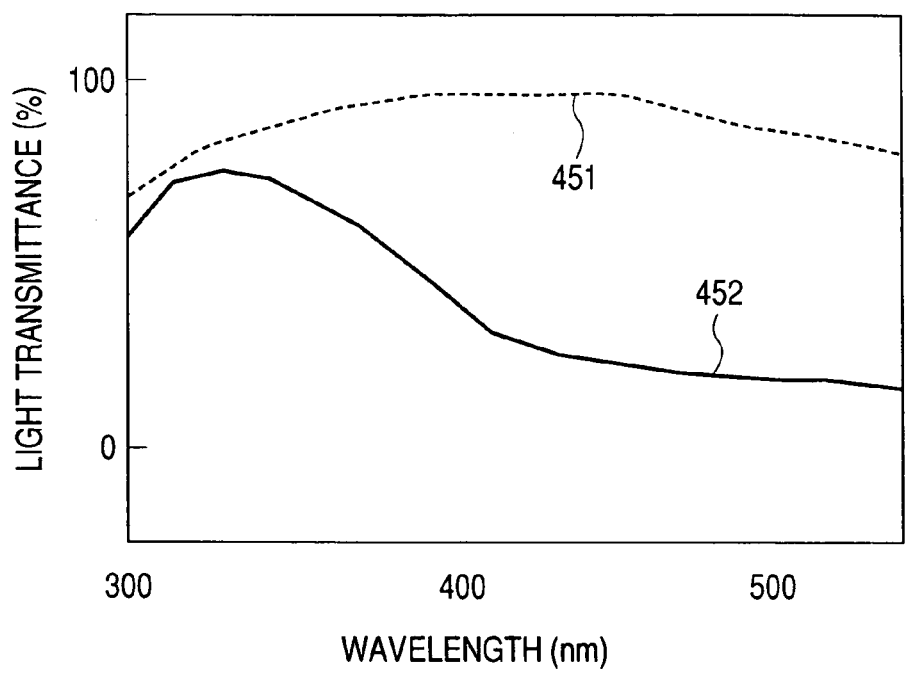
FIG. 20 shows a visible transmission spectrum of an information recording medium of an embodiment of the present invention.

FIG. 20 shows the absorption spectrum of an electrochromic layer of the information recording medium of the present invention. It was measured when a thoroughly stable state was reached after one minute had passed after applying a voltage. In FIG. 20, the dotted line 451 shows the spectrum when the voltage is not applied, and the solid line 452 is a spectrum when coloring by applying +3.0 V. An absorption band appeared at a wavelength around 400 nm when +3.0 V was applied. Therefore, this medium is suitable for recording using a blue-purple semiconductor laser having a wavelength of 400 nm.

Reading and writing on the fabricated information storage medium were carried out similarly to the first embodiment, according to the way described in FIG. 19. A semiconductor laser having an optical wavelength of 400 nm is used as a laser beam for information recording. Moreover, information was recorded by stopping down the laser beam on the information layer with the lens NA0.65 and irradiating the laser beam with an intensity of 6 mW, and then readout could be performed with the laser beam with an intensity of 0.5 mW. Read/write could be performed in the case of the information storage medium in which poly (3,4-ethoxythiophene) and poly (3-butylthiophene) were used for the conductive polymer electrochromic material.

Third Embodiment

Figure 21:
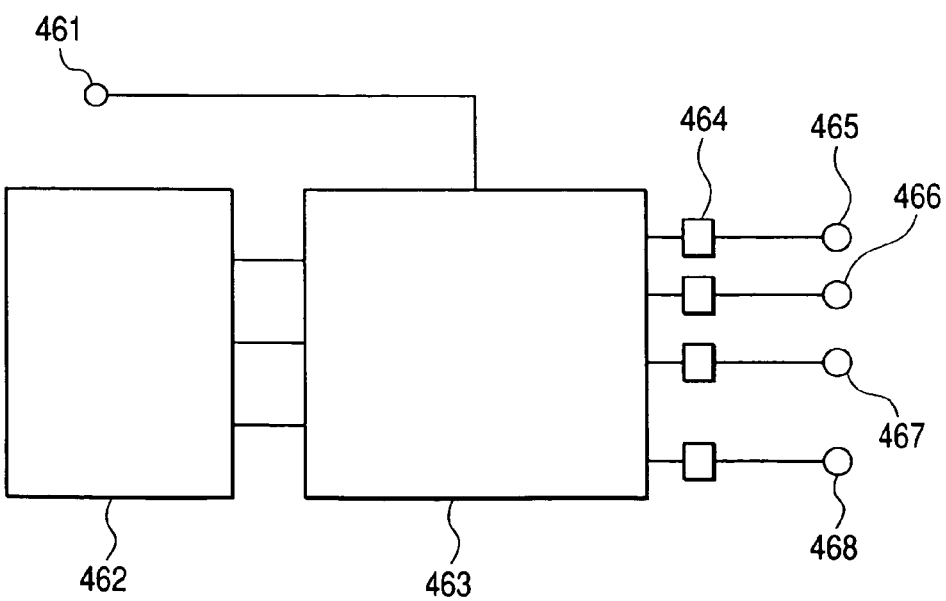
FIG. 21 is a block diagram illustrating an applied voltage control circuit to the medium of an embodiment of the present invention.

This embodiment relates to a multi-layered structure information storage medium and a recording device thereof. FIG. 21 is a block diagram illustrating a recording device control circuit. A voltage and a selection signal of the information storage medium are supplied to the three slip rings on the rotating shaft. The circuit including the condenser illustrated in FIG. 21 is built into the inside hollow of the disk receiving part and wiring to each layer of the right edge of the circuit block diagram is connected to the disk receiving electrode through the applied voltage switching and controlling circuit. In FIG. 21, 461 is the layer selection signal, 462 is the changeable power supply, 463 is the layer selection circuit, 464 is the current controller, 465 is the first layer selection signal, 466 is the second layer selection signal, 467 is the third layer selection signal, and 468 is the fourth layer selection signal.

Figure 22:
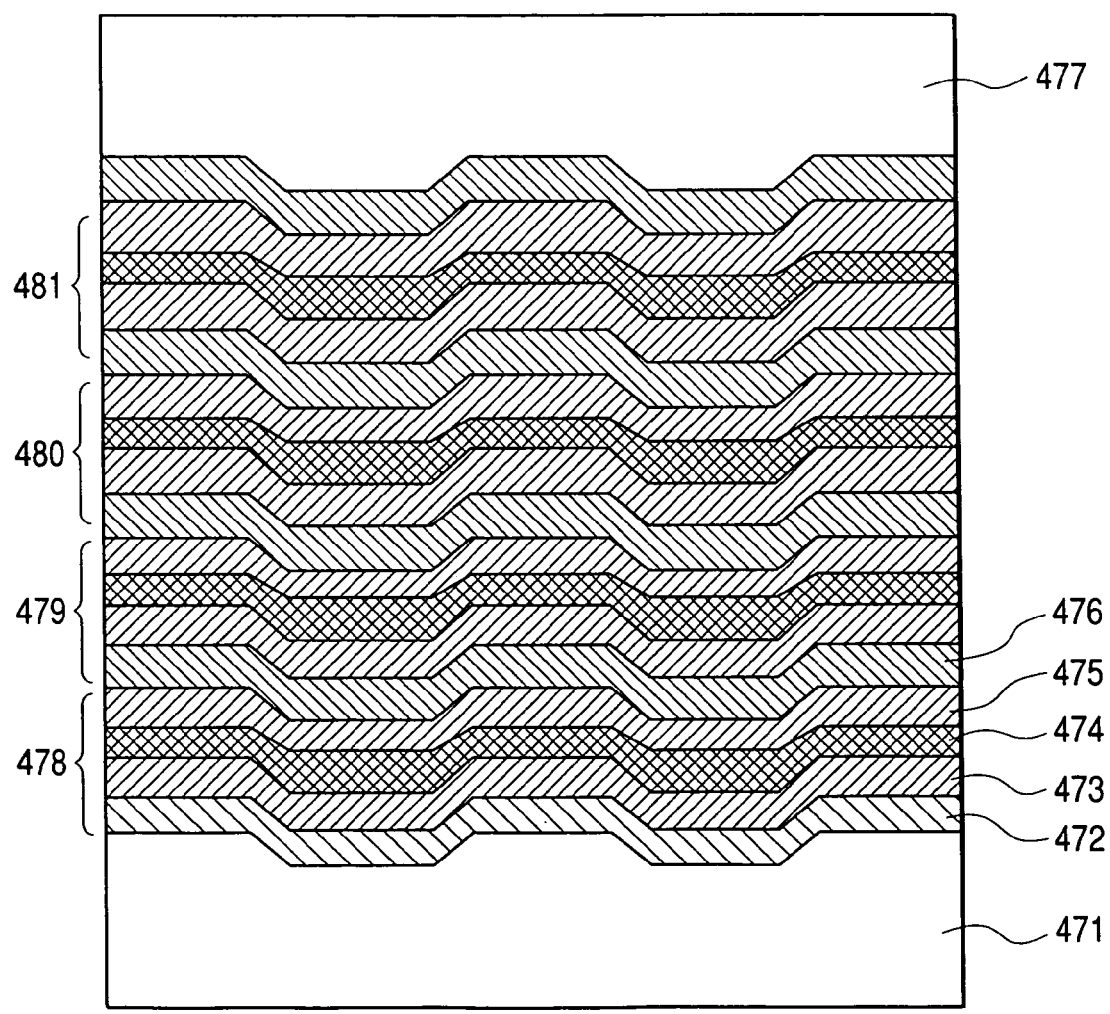
FIG. 22 is a cross-sectional view illustrating an information recording medium of an embodiment of the present invention.

The information recording layer has the same basic structure as the first embodiment. As shown in FIG. 22 in which the recording part was enlarged, it is 12 cm in diameter and 0.6 mm in thickness, and the grooves for tracking for in-groove recording with a track pitch of 0.74 μm, a depth of 23 nm, and a groove width of 0.35 μm are provided on the surface. The first layer 478 was formed on the polycarbonate substrate 471 in order of $SiO_2$ layer (10 nm) 472, IZO transparent electrode (30 nm) 473, electrochromic layer (80 nm) 474, and electrolyte layer (80 nm) 475. After depositing the $ZnS/SiO_2$ insulating layer (100 nm) 476 on top of it, the second layer 479, the third layer 480, and the fourth layer 481 are formed using the same process, and then a polycarbonate substrate 471, 120 mm in diameter and 0.6 mm in thickness, was bonded onto it. Light was irradiated from the bonded substrate side. The material used for the electrochromic layer 474 and the electrolyte layer 475 are the same as those used in the first embodiment.

The read/write method is the same as the first embodiment. When a voltage is applied to both sides of the desired information layer to read/write while irradiating the laser beam with a wavelength of 660 nm, only the layer is colored and starts absorbing and reflecting the laser beam, thereby, the information could be selectively recorded and reproduced. All multi-layers may be in the depth of focus of the aperture lens, and read/write to each layer may be performed by changing the focal position by sandwiching spacer layers 20-40 μm in thickness every several layers (for instance, every three layers). In this case, when more than two spacer layers are used, an element may be installed in the optical system to compensate for the spherical aberration.

Fourth Embodiment

Figure 25A:
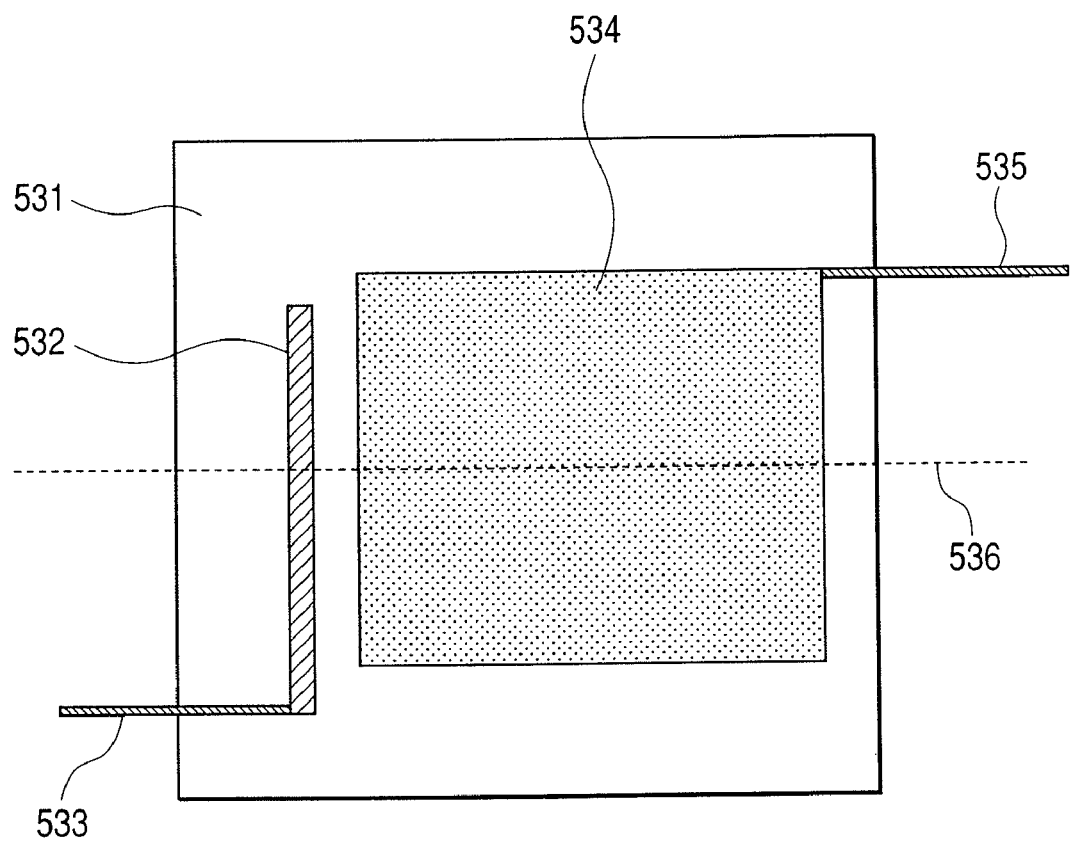
FIGS. 25A and B are a bird's-eye view and cross-sectional view, respectively, illustrating an information recording medium of an embodiment of the present invention.
Figure 25B:
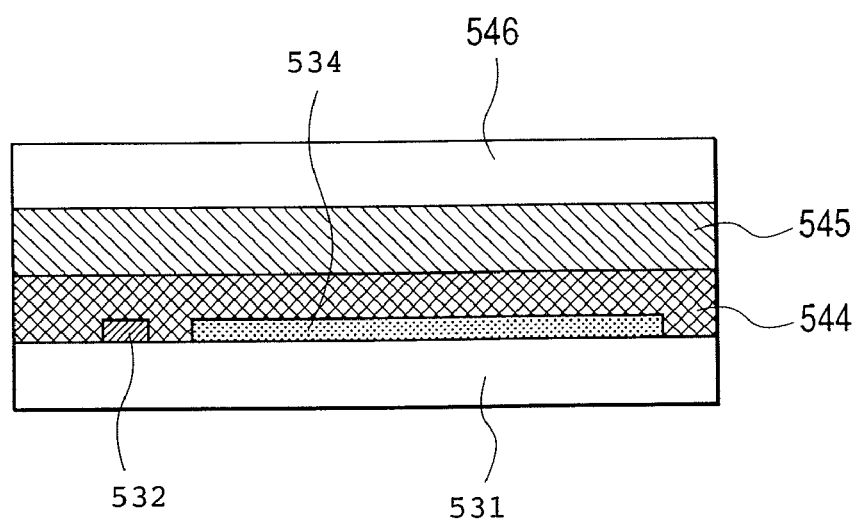

This embodiment relates to a card type optical memory having a multi-layered structure of electrochromic layers. The materials and the fabrication method thereof used for the electrolyte layer and electrochromic layer are the same as those of the first embodiment. The multi-layered optical memory of this embodiment has the structure shown in FIG. 26, and the electrochromic unit cell shown in FIGS. 25A and B is arranged in three-dimensions. The electrochromic unit cell shown in FIG. 25A is formed by electrically connecting the 200 nm wide, 10 μm long first electrode 532, which is a transparent electrode on the insulating glass substrate 531, to the wiring 533 (100 nm wide) to the first electrode 532. This wiring 533 is made of aluminum. A 1 mm square second electrode 534 and wiring 535 (500 nm wide) to the second electrode were formed, separated 500 nm from the first electrode. This wiring 535 is also made of aluminum. FIG. 25B is the cross-sectional view of the electrochromic unit cell at the center crossing line.

After forming the first electrode 532, the second electrode 534, and the wiring on the glass substrate 531, the electrolyte layer 544 (200 nm in thickness) and the electrochromic layer 543 (100 nm in thickness) are formed in order by rotation coating and a subsequent heating process. A 300 nm thick polyvinyl alcohol layer was deposited on it as the insulating protection layer 546. The first electrode 532 is used as a reference electrode for coloring/decoloring, and the recording information is written on the second electrode 534 which has a relatively larger surface area.

Figure 26:
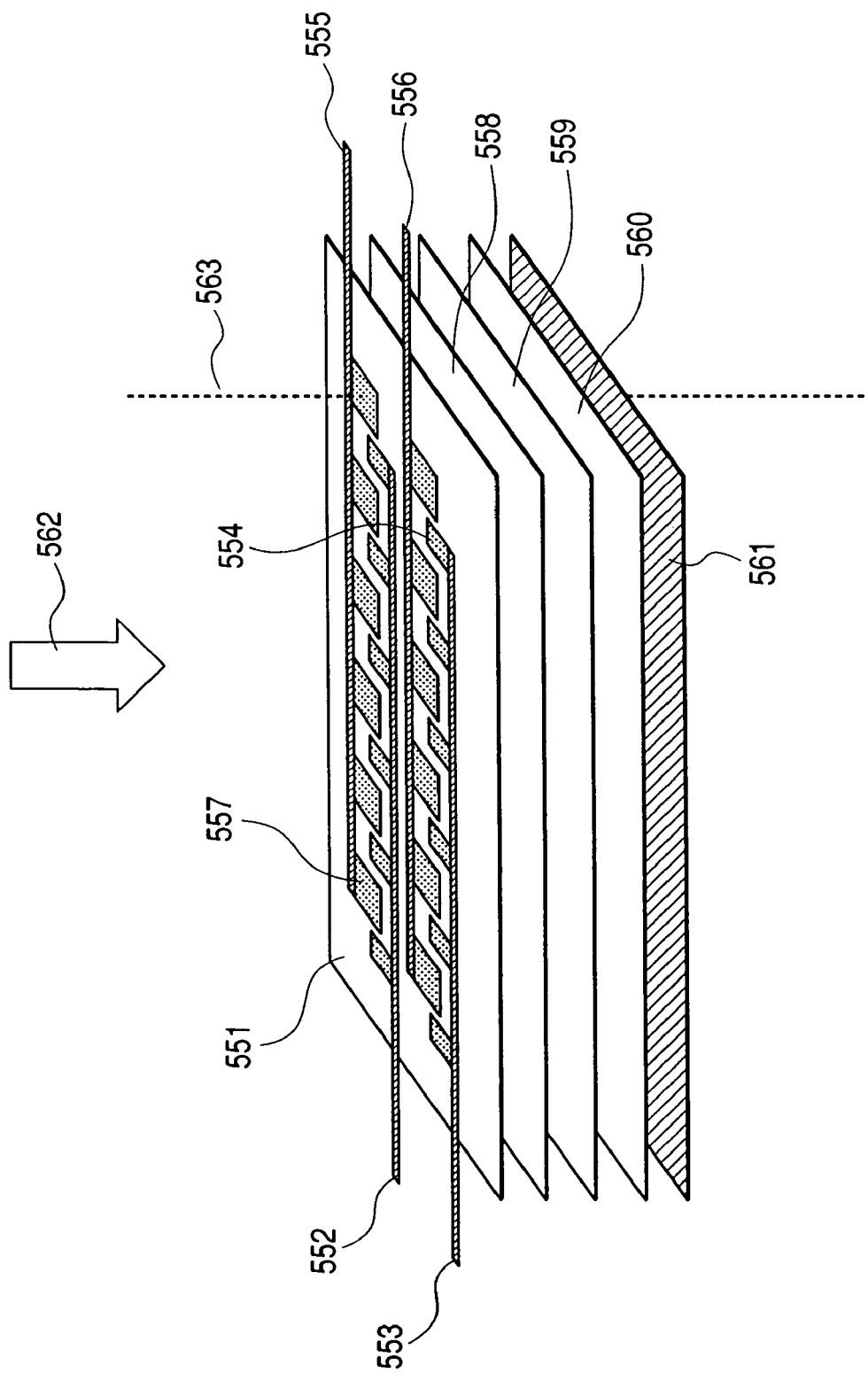
FIG. 26 shows a configuration of an information recording medium of an embodiment of the present invention.

The electrochromic unit cell shown in FIG. 25 is arranged two-dimensionally in the same layer as shown in FIG. 26. FIG. 26 is a structure illustrating an optical memory, in which four layers of an electrochromic element having two arrays with six cells per array are laminated. In FIG. 26, electricity is supplied from the power supply to the array with six cells in a horizontal direction by wiring 552 and wiring 553 for the first electrode group. Electricity is supplied from the power supply to the second electrode group by wiring 555 and wiring 556. The aluminum reflection layer (50 nm in thickness) and the bottom protection layer (500 nm in thickness) 561 are formed at the bottom of the four layers.

Figure 27:
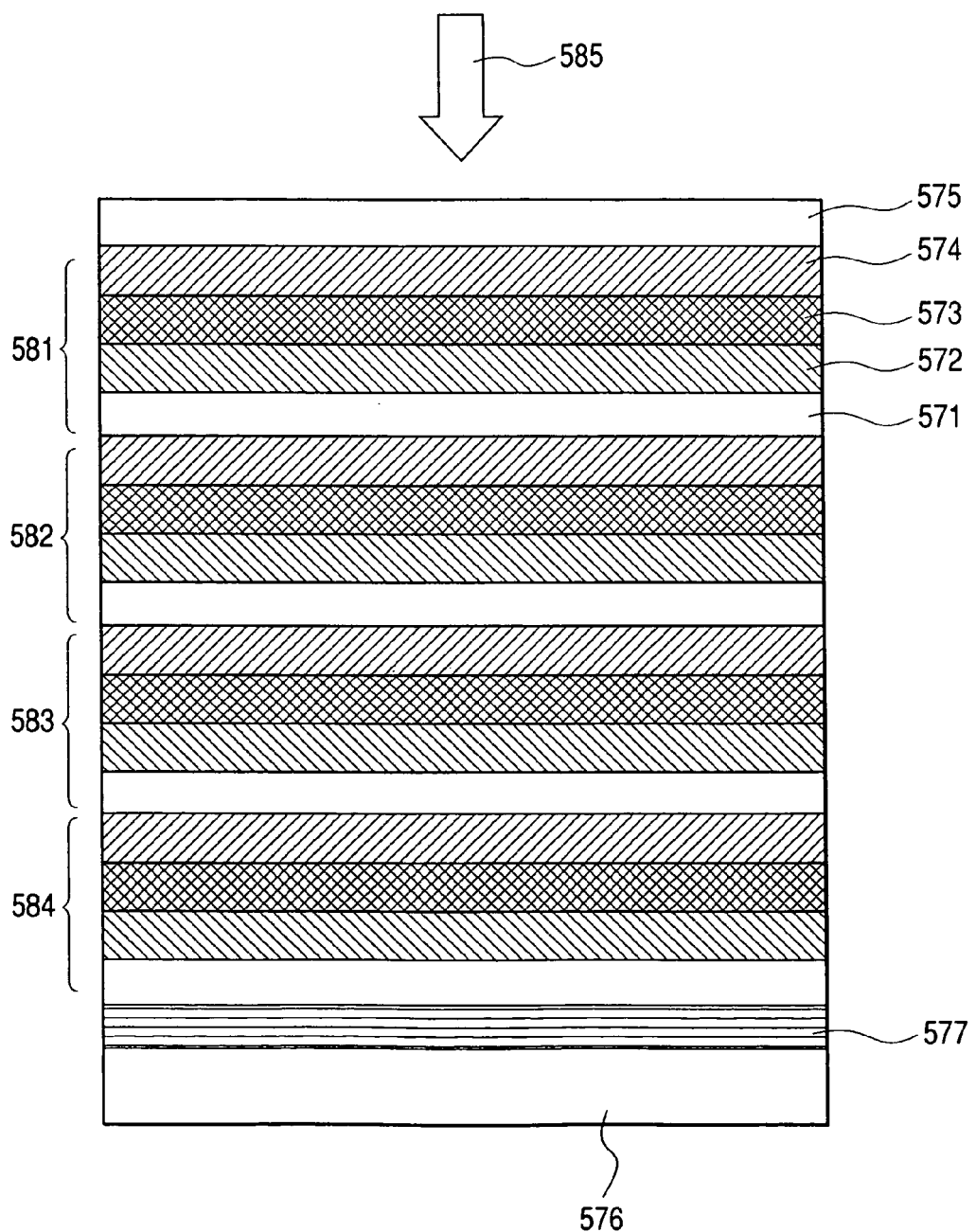
FIG. 27 is a cross-sectional view illustrating an information recording medium of an embodiment of the present invention.

FIG. 27 is a cross-sectional view at the part of the perforating line 563 of the multi-layered memory shown in FIG. 26. The layered structure consisting of the insulating layer 571, the transparent electrode layer 572, the electrolyte layer 573, and the electrochromic layer 574 is laminated as the first layer 581, the second layer 582, the third layer 583, and the fourth layer 584. The upper protection layer 575 made of polycarbonate is formed on the side of the laser beam irradiation direction 585, and the reflection layer 577 and the bottom insulating protection layer 576 are formed on the opposite side.

In the layer performing the read/write for the multi-layered optical memory (first layer), recording is carried out by applying a voltage to make the potential of the second electrode +5 V for the first electrode and by scanning the laser beam with a wavelength of 660 nm and an intensity of 10 mW in the condition in which the second electrodes are all colored. The wiring and electrode arrangement in the layer is recorded as address information during the read/write. Readout of the recording can be similarly done by coloring the layer (first layer) of interest, scanning the laser beam with a wavelength of 660 nm and an intensity of 3 mW, and monitoring the reflecting light intensity, resulting in a successful read/write. Moreover, while the whole first layer is decolored, the read/write could be performed in the second layer the same as the first layer.

Fifth Embodiment

Figure 28A:
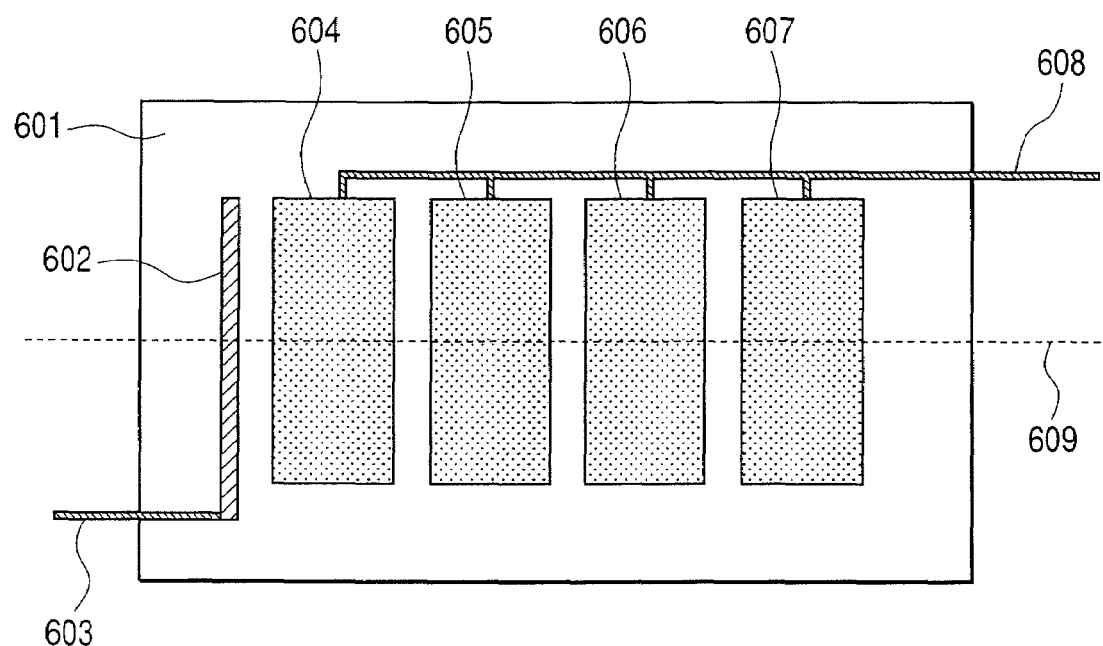
FIGS. 28A and B are a bird's-eye view and cross-sectional view, respectively, illustrating an information recording medium of an embodiment of the present invention.

<Parallel>
This embodiment relates to a card type optical memory having a multi-layered electrochromic layer. The materials and the fabrication method thereof used for the electrolyte layer and electrochromic layer are the same as those of the first embodiment. The multi-layered optical memory of this embodiment has the structure shown in FIG. 30, and the electrochromic unit cell shown in FIGS. 28A and B is arranged in three-dimensions. The electrochromic unit cell shown in FIG. 28A is formed by electrically connecting the 200 nm wide and 1 mm long first electrode 602, which is a transparent electrode on the insulating glass substrate 601, to the wiring 603 (200 nm wide) to the first electrode 602. This wiring 603 is made of aluminum. The 0.3 mm wide, 1 mm long second electrode 604 was formed, separated 200 nm from the first electrode 602. Moreover, the third electrode 605, the fourth electrode 606, and the fifth electrode 607 are formed with a 200 nm gap. The wiring 608 is connected to the second electrode 604, the third electrode 60, the fourth electrode 606, and the fifth electrode 607, respectively. This wiring 608 is also made of aluminum.

Figure 28B:
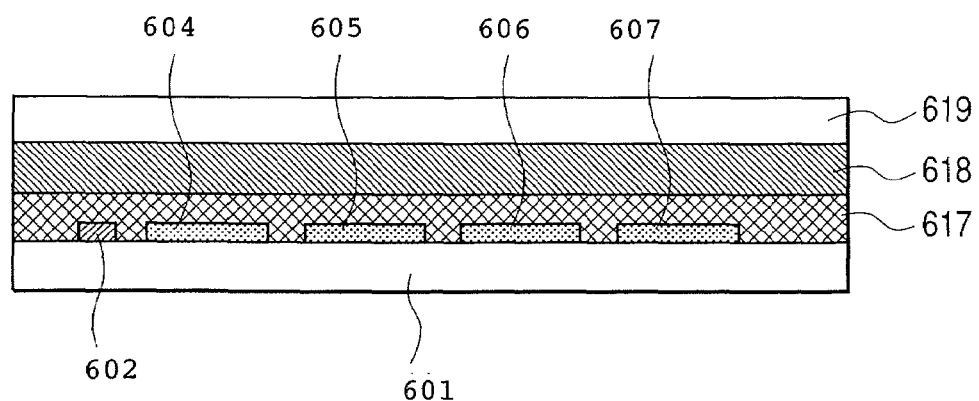

FIG. 28B is the cross-sectional view of the electrochromic unit cell at the center crossing line. After forming the first electrode 602, the second electrode 604, the third electrode 605, the fourth electrode 606, the fifth electrode 607 and the wiring on the glass substrate 601, the electrolyte layer 617 (200 nm in thickness) and the electrochromic layer 618 (100 nm in thickness) are formed in order by rotation coating and a subsequent heating process. A 300 nm thick polyvinyl alcohol layer was deposited on it as the insulating protection layer 619. The first electrode 602 is used as a reference electrode for coloring/decoloring, and the recording information is written on the second electrode 604, the third electrode 605, the fourth electrode 606, and the fifth electrode 607, which has a relatively larger surface area.

Figure 29A:
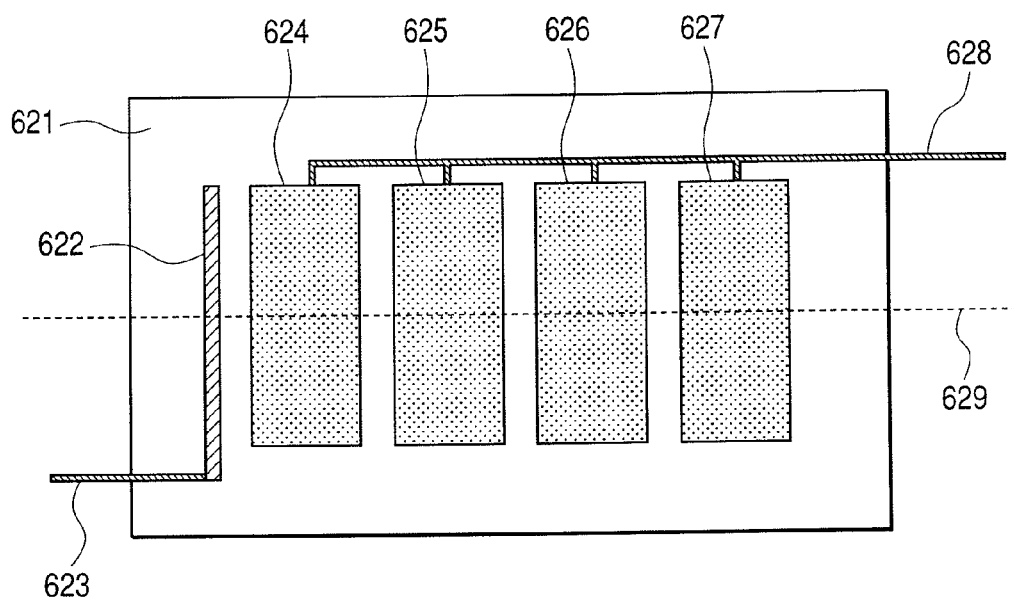
FIGS. 29A and B are a bird's-eye view and cross-sectional view, respectively, illustrating an information recording medium of an embodiment of the present invention.
Figure 29B:
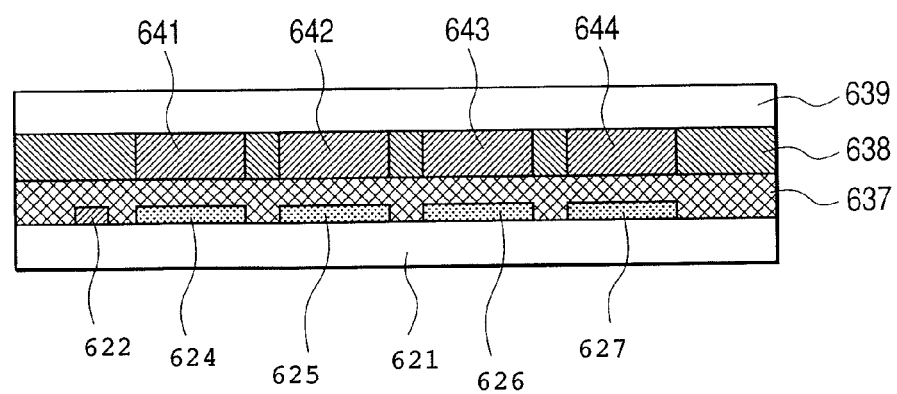

The electrochromic unit cell shown in FIG. 28 is fabricated so that the four electrodes, from the second to the fifth, have equal potential. In FIG. 29A, when a voltage is applied to the first electrode 602 to make the potential from the second to the fifth electrode 6 V, parts of the electrochromic layer on the second electrode 624, the third electrode 625, the fourth electrode 626, and the fifth electrode 627 were colored, as shown in FIG. 29A. It is also shown in the cross-sectional view of FIG. 29B. The colored part was turned clear by stopping the applied voltage or by applying a voltage not more than 6 V with an opposite polarity. This coloring/decoloring could be repeated one million times when a voltage ±6 V was applied respectively for one second.

Although the wiring 628 from the second electrode to the fifth electrode was arranged in parallel in the electrochromic unit cell shown in FIG. 28, the coloring/decoloring of the four electrodes, from the second electrode to the fifth electrode, could be individually carried out in the case when wiring was arranged individually from the power supply and a switch element like a TFT was provided midway from the wiring 628 to each electrode.

Figure 30:
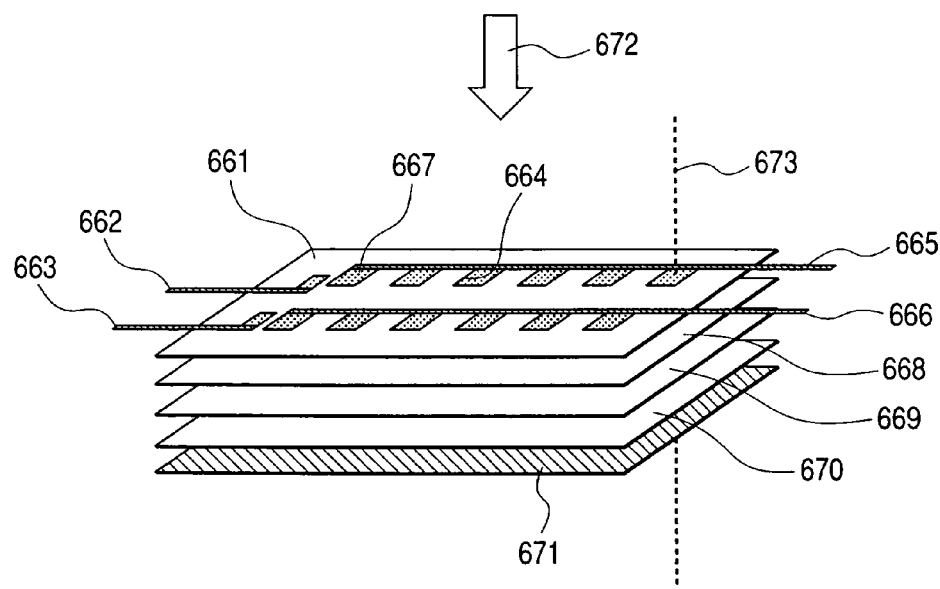
FIG. 30 shows a configuration of an information recording medium of an embodiment of the present invention.

The electrochromic unit cell shown in FIG. 28 is arranged two-dimensionally in the same layer as shown in FIG. 30. FIG. 30 is a structure illustrating an optical memory, in which four layers of an electrochromic element having two cells in one layer are laminated. Supplying electricity from the power supply is carried out in the same way as the fourth embodiment. An aluminum reflection layer (50 nm thick) and the bottom protection layer (500 μm thick) 561 made of polycarbonate are further formed on the underside of the laminated 4-layer. A cross-sectional view at the part of the perforating line 673 of the multi-layered memory of FIG. 30 is shown in FIG. 27 being the same as the cross-sectional view of the fourth embodiment.

In the layer (first layer) performing the read/write for this multi-layered optical memory, recording is carried out by applying a voltage to the first electrode to make the potential of the second electrode +5 V, and by scanning the laser beam with a wavelength of 660 nm and an intensity of 10 mW in the condition where the second electrodes are all colored. The wiring and electrode arrangement in the layer is recorded as address information during the read/write. Readout of the recording can be similarly done by coloring the layer (first layer) of interest, scanning the laser beam with a wavelength of 660 nm and an intensity of 3 mW, and by monitoring the reflecting light intensity, resulting in a successful read/write. Moreover, while the whole first layer is decolored, the read/write could be performed in the second layer the same as the first layer. The read/write could be performed in the third and fourth layers in the same way.

The present invention has the possibility of being used in the industrial field relating to an information recording medium, an information recording device, and an information recording method in which information is recorded using light.

What is claimed is:

1. An information recording medium, comprising:
    a first insulating member,
    first and second electrodes formed in one plane of said first insulating member, and
    a first conductive layer including an electrochromic material providing continuity with said first and second electrodes,
    wherein the gap between said first and second electrodes is insulated.

2. An information recording medium according to claim 1, wherein
    said first conductive layer comprises an electrochromic layer including said electrochromic material formed connecting to said first and second electrodes and an electrolyte layer including ions diffused into said electrochromic layer and connected to said electrochromic layer.

3. An information recording medium according to claim 1, wherein
    said first conductive layer comprises an electrolyte layer formed connecting with said first and second electrodes and an electrochromic layer including said electrochromic material connected to said electrolyte layer.

4. An information recording medium according to claim 1, wherein
    said first conductive layer is a conductive polymer electrochromic material and contains at least one compound selected from polythiophene and its derivatives, polypyrrole and its derivatives, polyaniline and its derivatives, poly(trimethyl silylphenylacetylene), and poly(dialkoxy phenylenevinylene).

5. An information recording medium according to claim 1, wherein
    said first conductive layer contains at least one compound selected from tungsten oxide, iridium oxide, nickel oxide, titanium oxide, and vanadium pentoxide.

6. An information recording medium according to claim 1, wherein
    said first conductive layer contains at least one compound selected from viologen, alkylviologen having an alkyl group with a carbon number from 1 to 20, metal phthalocyanine complex, porphyrin derivatives, and bathophenanthroline derivatives.

7. An information recording medium according to claim 1, wherein
    said first and second electrodes are one of ITO (indium tin oxide), IZO (indium zinc oxide), and tin oxide $SnO_2$.

8. An information recording medium according to claim 1, comprising:
    a second insulating member provided on said first conductive layer,
    third and fourth electrodes formed in one plane of said second insulating member, and
    a second conductive layer including an electrochromic material providing continuity with said third and fourth electrodes,
    wherein the gap between said third and fourth electrodes is insulated.

9. An information recording medium according to claim 8, wherein
    said first conductive layer comprises a first electrochromic layer including said electrochromic material formed connecting to said first and second electrodes and a first electrolyte layer including ions diffused into said electrochromic layer and connected to said first electrochromic layer, and
    said second conductive layer comprises a second electrochromic layer including said electrochromic material formed connecting to said third and fourth electrodes and a second electrolyte layer including ions diffused into said electrochromic layer and connected to said second electrochromic layer.

10. An information recording medium according to claim 8, wherein
    said first conductive layer comprises a first layer formed connecting to said first and second electrodes and a first electrochromic layer including said electrochromic material connected to said electrolyte layer, and
    said second conductive layer comprises a second layer formed connecting to said third and fourth electrodes and a second electrochromic layer including said electrochromic material connected to said electrolyte layer.

11. An information recording medium, comprising:
    an insulating member,
    first, second, and third electrodes formed in one plane of said second insulating member, and a conductive layer including an electrochromic material providing continuity with the gap between the first and second electrodes and the gap between the first and third electrodes, wherein the gaps between said first electrode, said second electrode, and third electrode are insulated from each other.

12. An information recording medium according to claim 11, wherein a positive voltage is applied to said first electrode and a negative voltage is applied to said second and third electrodes.

13. An information recording medium according to claim 11, wherein a negative voltage is applied to said first electrode and a positive voltage is applied to said second and third electrodes.

14. An information recording medium according to claim 11, wherein a voltage can be applied to at least one side of the electrode gaps between said first and second electrodes or the electrode gap between said first and third electrodes.

15. An information recording medium according to claim 11, wherein said conductive layer comprises an electrochromic layer including said electrochromic material formed connecting to said first, second, and third electrodes and an electrolyte layer including ions diffused into said electrochromic layer and connected to said electrochromic layer.

16. An information recording medium according to claim 11, wherein said conductive layer comprises an electrolyte layer formed connecting to said first, second, and third electrodes and an electrochromic layer including said electrochromic material connected to said electrolyte layer.

17. An information recording method of the information recording device for recording information on an information recording medium and for reading information from the information recording medium which comprises an insulating member, first and second electrodes formed in one plane of the insulating member, and a conductive layer including an electrochromic material providing continuity with said first and second electrodes, the method comprising the steps of:

coloring said conductive layer by applying a voltage to the gap between said first and second electrodes for the information recording medium in which the gap between said first and second electrodes is insulated; and recording information by irradiating light to said colored conductive layer.

* * * * *